US008389107B2

(12) United States Patent
Riebel et al.

(10) Patent No.: US 8,389,107 B2
(45) Date of Patent: Mar. 5, 2013

(54) CELLULOSIC BIOLAMINATE COMPOSITE ASSEMBLY AND RELATED METHODS

(75) Inventors: Michael J. Riebel, Mankato, MN (US); Milton Riebel, Mankato, MN (US)

(73) Assignee: Biovation, LLC, Mankato, MN (US)

(*) Notice: Subject to any disclaimer, the term of this patent is extended or adjusted under 35 U.S.C. 154(b) by 0 days.

(21) Appl. No.: 13/182,767

(22) Filed: Jul. 14, 2011

(65) Prior Publication Data

US 2011/0262720 A1 Oct. 27, 2011

Related U.S. Application Data

(63) Continuation-in-part of application No. 13/019,060, filed on Feb. 1, 2011, which is a continuation of application No. 12/410,018, filed on Mar. 24, 2009.

(60) Provisional application No. 61/364,298, filed on Jul. 14, 2010, provisional application No. 61/038,971, filed on Mar. 24, 2008.

(51) Int. Cl.
*B32B 23/06* (2006.01)

(52) U.S. Cl. .................. 428/211.1; 428/195.1; 428/480; 428/481; 428/534; 428/535

(58) Field of Classification Search ............... 428/195.1, 428/211.1, 480, 481, 534, 535
See application file for complete search history.

(56) References Cited

U.S. PATENT DOCUMENTS 2,774,698 A 12/1956 Jenk et al.
2,813,046 A 11/1957 Lauring
2,816,851 A * 12/1957 Arledter ..................... 428/211.1
3,131,116 A 4/1964 Pounds
3,864,201 A 2/1975 Susuki et al.
4,104,828 A 8/1978 Naslund et al.
4,136,224 A 1/1979 Minami et al.
4,509,559 A 4/1985 Cheetham et al.
4,929,497 A 5/1990 Mitchell et al.
5,434,004 A 7/1995 Ajioka et al.
5,470,944 A 11/1995 Bonsignore
5,540,962 A 7/1996 Suskind
5,631,066 A 5/1997 O'Brien
5,744,149 A 4/1998 Girardot
5,756,651 A 5/1998 Chen et al.
5,830,548 A 11/1998 Andersen et al.
5,834,582 A 11/1998 Sinclair et al.
5,852,166 A 12/1998 Gruber et al.
5,883,199 A 3/1999 McCarthy et al.
5,891,576 A 4/1999 Imai et al.
5,908,918 A 6/1999 Chen et al.
5,928,741 A 7/1999 Andersen et al.

(Continued)

FOREIGN PATENT DOCUMENTS

CA 2460580 A1 3/2003
DE 198 05 672 A1 8/1999

(Continued)

OTHER PUBLICATIONS

Shawaphun, S. et al. "Paper Coating with Biodegradable Polymer for Food Packaging," Scientific Journal Ubon Ratchathani University, 1(1): 51-57 (2010).

(Continued)

*Primary Examiner* — Gerard Higgins
*Assistant Examiner* — Christopher Polley
(74) *Attorney, Agent, or Firm* — Winthrop & Weinstine, P.A.

(57) ABSTRACT

Cellulosic biolaminate assemblies are provided. In one embodiment, a biolaminate structure is provided comprising a first cellulosic layer, a second cellulosic layer, and a first bio-based polymer. The first bio-based polymer impregnates the first cellulosic layer and the second cellulosic layer. The first cellulosic layer and the second cellulosic layer are fused together.

13 Claims, 3 Drawing Sheets

100
102
104
106
104
102

U.S. PATENT DOCUMENTS

| | | | |
|---|---|---|---|
| 5,998,552 | A | 12/1999 | Gruber et al. |
| 6,080,478 | A | 6/2000 | Karhuketo |
| 6,153,306 | A | 11/2000 | Selin et al. |
| 6,183,814 | B1 | 2/2001 | Nangeroni et al. |
| 6,291,597 | B1 | 9/2001 | Gruber et al. |
| 6,573,340 | B1 | 6/2003 | Khemani et al. |
| 6,599,334 | B1 | 7/2003 | Anderson |
| 6,645,584 | B1 | 11/2003 | Kuusipalo et al. |
| 6,706,145 | B2 | 3/2004 | Werres et al. |
| 6,743,490 | B2 | 6/2004 | Fushihara et al. |
| 6,770,104 | B2 | 8/2004 | Murphy |
| 6,808,795 | B2 | 10/2004 | Noda et al. |
| 6,946,182 | B1 | 9/2005 | Allgeuer et al. |
| 6,951,595 | B2 | 10/2005 | Carlson, Jr. et al. |
| 7,132,490 | B2 | 11/2006 | Obuchi et al. |
| 7,160,977 | B2 | 1/2007 | Hale et al. |
| 7,172,814 | B2 | 2/2007 | Hodson |
| 7,225,487 | B2 | 6/2007 | Small, Jr. et al. |
| 7,235,287 | B2 | 6/2007 | Egawa |
| 7,256,223 | B2 | 8/2007 | Mohanty et al. |
| 7,297,394 | B2 | 11/2007 | Khemani et al. |
| 7,320,773 | B2 | 1/2008 | Egawa |
| 7,332,119 | B2 | 2/2008 | Riebel |
| 7,332,214 | B2 | 2/2008 | Ozasa et al. |
| 7,344,784 | B2 | 3/2008 | Hodson |
| 7,348,052 | B2 | 3/2008 | Mueller et al. |
| 7,354,656 | B2 | 4/2008 | Mohanty et al. |
| 7,393,590 | B2 | 7/2008 | Scheer et al. |
| 7,547,650 | B2 | 6/2009 | Keep |
| 7,632,897 | B2 | 12/2009 | Matsumoto et al. |
| 7,678,444 | B2 | 3/2010 | Tedford, Jr. et al. |
| 7,736,560 | B2 | 6/2010 | Nelson |
| 7,785,682 | B2 | 8/2010 | Sato et al. |
| 7,799,412 | B2 | 9/2010 | Yamamura et al. |
| 7,820,276 | B2 | 10/2010 | Sukigara et al. |
| 7,867,422 | B2 | 1/2011 | Nelson et al. |
| 7,867,622 | B2 | 1/2011 | Endo et al. |
| 7,888,405 | B2 | 2/2011 | Gohil et al. |
| 2002/0065345 | A1 | 5/2002 | Narita et al. |
| 2002/0100565 | A1 | 8/2002 | Riebel et al. |
| 2003/0175488 | A1 | 9/2003 | Asthana et al. |
| 2004/0028958 | A1 | 2/2004 | Assink et al. |
| 2004/0143045 | A1 | 7/2004 | Morgan et al. |
| 2004/0157042 | A1 | 8/2004 | Ackerman et al. |
| 2005/0112352 | A1 | 5/2005 | Laney et al. |
| 2006/0046034 | A1 | 3/2006 | Schober |
| 2006/0083151 | A1 | 4/2006 | Kinoshita et al. |
| 2006/0199729 | A1 | 9/2006 | Naganuma et al. |
| 2006/0246307 | A1 | 11/2006 | Chang |
| 2006/0257676 | A1 | 11/2006 | Itada et al. |
| 2007/0048482 | A1 | 3/2007 | Kadlec |
| 2007/0202283 | A1 | 8/2007 | Meazle et al. |
| 2007/0259139 | A1 | 11/2007 | Furneaux |
| 2007/0259195 | A1 | 11/2007 | Chou et al. |
| 2007/0264508 | A1 | 11/2007 | Gabelnick et al. |
| 2007/0275617 | A1 | 11/2007 | Harris et al. |
| 2007/0287795 | A1 | 12/2007 | Huda et al. |
| 2008/0026235 | A1 | 1/2008 | Terasawa et al. |
| 2008/0038560 | A1* | 2/2008 | Knoerzer et al. .......... 428/411.1 |
| 2008/0044603 | A1 | 2/2008 | Hutchinson et al. |
| 2008/0081158 | A1 | 4/2008 | Winey et al. |
| 2008/0099540 | A1 | 5/2008 | Mueller et al. |
| 2008/0125532 | A1 | 5/2008 | Nelson |
| 2008/0160327 | A1 | 7/2008 | Knoerzer et al. |
| 2008/0188154 | A1 | 8/2008 | Leis et al. |
| 2008/0241509 | A1 | 10/2008 | Lai |
| 2009/0004941 | A1 | 1/2009 | Kim et al. |
| 2009/0042003 | A1 | 2/2009 | Govang et al. |
| 2009/0047511 | A1 | 2/2009 | Tilton |
| 2009/0096703 | A1 | 4/2009 | Chase et al. |
| 2009/0130355 | A1 | 5/2009 | Chen et al. |
| 2009/0148656 | A1 | 6/2009 | Hsu |
| 2009/0148715 | A1 | 6/2009 | Lee |
| 2009/0155593 | A1 | 6/2009 | O'Brien et al. |
| 2009/0197089 | A1 | 8/2009 | Klippert |
| 2009/0239067 | A1 | 9/2009 | Verlaan et al. |
| 2009/0239433 | A1 | 9/2009 | Kurihara et al. |
| 2009/0246544 | A1 | 10/2009 | Narita et al. |
| 2009/0258172 | A1 | 10/2009 | Bowden et al. |
| 2009/0263600 | A1 | 10/2009 | Miyashita et al. |
| 2009/0264560 | A1 | 10/2009 | Warnes et al. |
| 2009/0297652 | A1 | 12/2009 | Aritake |
| 2009/0326152 | A1 | 12/2009 | Li et al. |
| 2010/0003431 | A1 | 1/2010 | Raybuck |
| 2010/0009104 | A1 | 1/2010 | Greelis et al. |
| 2010/0009208 | A1 | 1/2010 | Lee |
| 2010/0015420 | A1 | 1/2010 | Riebel et al. |
| 2010/0159203 | A1 | 6/2010 | Shi et al. |
| 2010/0210745 | A1 | 8/2010 | McDaniel et al. |
| 2010/0239800 | A1 | 9/2010 | Ikeda et al. |
| 2010/0239816 | A1 | 9/2010 | Kinkade |
| 2010/0240801 | A1 | 9/2010 | Nelson et al. |
| 2010/0285266 | A1 | 11/2010 | Korte |
| 2010/0297414 | A1 | 11/2010 | Brentrup et al. |
| 2010/0311905 | A1 | 12/2010 | Mentink et al. |
| 2010/0323212 | A1 | 12/2010 | Chang et al. |
| 2010/0324160 | A1 | 12/2010 | Heiskanen et al. |
| 2011/0045284 | A1 | 2/2011 | Matsukawa et al. |
| 2011/0049002 | A1 | 3/2011 | Georgelos et al. |
| 2011/0052867 | A1 | 3/2011 | Yamamura et al. |
| 2011/0052881 | A1 | 3/2011 | Netravali et al. |
| 2011/0070410 | A1 | 3/2011 | Huang et al. |

FOREIGN PATENT DOCUMENTS

| | | | |
|---|---|---|---|
| DE | 10104829 | A1 | 8/2002 |
| DE | 102005004789 | A1 | 8/2006 |
| EP | 0 514 137 | A2 | 11/1992 |
| EP | 1 361 039 | A1 | 11/2003 |
| EP | 1 837 363 | A1 | 9/2007 |
| EP | 1 444 285 | B1 | 1/2009 |
| GB | 2 096 944 | A | 10/1982 |
| GB | 2 473 737 | A | 3/2011 |
| JP | 61089263 | A | 5/1986 |
| JP | 8244836 | A | 9/1996 |
| JP | 8284096 | A | 10/1996 |
| JP | 11207873 | A | 8/1999 |
| JP | 2003-082271 | A | 3/2003 |
| JP | 2004-27079 | A | 1/2004 |
| JP | 2008-062588 | | 3/2008 |
| JP | 2008-207535 | A1 | 9/2008 |
| JP | 2010-077275 | A | 4/2010 |
| WO | WO 89/11240 | A1 | 11/1989 |
| WO | WO 96/12851 | A1 | 5/1996 |
| WO | WO 2011/012935 | A2 | 2/2001 |
| WO | WO 2007/088833 | A1 | 8/2007 |
| WO | WO 2008/116466 | A2 | 10/2008 |
| WO | WO 2009/064052 | A1 | 5/2009 |
| WO | WO 2009/120311 | A2 | 10/2009 |

OTHER PUBLICATIONS

Levit, M. et al. "Composites Based on Polylactic Acid and Cellulosic Fibrous Materials: Mechanical Properties and Biodegradability," Antec 1996, vol. II, Conference proceedings, Indianapolis, IN, Eds. SPE, May 5-10, 1996, p. 1387-1991.

Li, Jiashen et al. "Hydroxyapatite Nano-Particles Coating on the Pore Surface Within Poly(DL-lactic-co-glycolic acid) Scaffold," Key Engineering Materials, 5$^{th}$ Asian-Australasian Conference on Composite Materials (ACCM-5), Hong Kong, Nov. 27-30, 2006, pp. 334-335, part 2, pp. 1237-1240.

Debaets, M. "PLA Films Laminated to Paper: A Unique Sustainable Packaging Concept," Bioplastics Magazine, 3(6): 18-19 (Nov.-Dec. 2008).

Hermann, B. et al. "Twisting Biomaterials around your little finger: Environmental impacts of bio-based wrappings," International Journal of Life Cycle Assessment, 15(4): 346-358 (2010).

Krikorian, Vahik et al. "Poly (L-lactic acid)/layered silicate nanocomposite: fabrication, characterization, and properties," Chemistry of Materials, 15(22): 4317-4324 (2003).

Ray, Sinha et al. "Biodegradable polylactide and its nanocomposites: Opening a new dimension for plastics and composites," Macromolecular Rapid Communications, 24(14): 815-840 (2003).

Lee, Sang-Rock et al. "Microstructure, tensile properties, and biodegradability of aliphatic polyester/clay nanocomposites," Polymer, 43(8): 2495-2500 (2002).

Vink, David. "Plasma Coated PLA and PP Could Match PET, says IKV," European Plastics News, 36(9): 14 (Oct. 2009).
Jiang, Long et al. "Properties of Poly(Lactic Acid)/Poly(Butylene Adipate-Coterephthalate)/Nanoparticle Ternary Composites," Industrial and Engineering Chemistry Research, 48(16): 7594-7602 (Aug. 19, 2009).
Chouzouri G. et al. "Biocomposites Based on Poly(L-Lactic Acid) and a Functional Synthetic Filler," ANTEC 2004, Proceedings of the $62^{nd}$ SPE Annual conference held Chicago, IL, ed. SPE (May 16-20, 2004).
Ryan C.M. et al. "Branching of Polylactic Acid to Increase Melt Strength for Extrusion Coating," TAPPI 1997 Polymers, Laminations and Coatings Conference, Conference Proceedings, Book 1, ed. TAPPI, Toronto, Ontario (Aug. 24-28, 1997), p. 139-144.
Ogata, N. et al. "Structure and thermal/mechanical properties of poly(L-lactide)-clay blend," J. Polym. Sci, Part B: Polym. Phys. 35(2): 389-396 (1997).
Arikawa Y. et al. Controlled Degradation of Porous Poly(lactide) Stereocomplex Films Prepared by the Selective Extraction of Co-Assembled Poly(Vinyl Alcohol), Polymer Bulletin, 58(4): 703-709 (Apr. 2007).
Pluta, M. "Morphology and properties of polylactide modified by thermal treatment, filling with layered silicates and plasticization," Polymer, 45(24): 8239-8251 (2004).
Chapple, S., et al. "Flammability of Natural Fiber-Reinforced Composites and Strategies for Fire Retardancy: A Review," Journal of Thermoplastic Composite Materials, p. 1-9, published Jan. 5, 2010, retrieved online on May 11, 2011 from <http://jtc/sagepub.com/content/early/2010/01/05/0892705709356338.abstract>.
Ooka et al. "Prevention of photocatalytic deterioration of resins using T102 pillared fluoromica", Applied Clay Science, Elsevier Science, vol. 42, No. 3-4, pp. 363-367 (Jan. 1, 2009).

* cited by examiner

CELLULOSIC BIOLAMINATE COMPOSITE ASSEMBLY AND RELATED METHODS

This application is a Continuation-in-Part of U.S. patent application Ser. No. 13/019,060, filed Feb. 1, 2011, entitled "Biolaminate Composite Assembly and Related Methods," which is a Continuation of U.S. patent application Ser. No. 12/410,018, filed Mar. 24, 2009, which claims priority to U.S. Provisional Application No. 61/038,971, filed Mar. 24, 2008. This application also claims priority to U.S. Provisional Application No. 61/364,298, filed Jul. 14, 2010. The contents of all above-mentioned applications are hereby incorporated in their entirety by reference.

BACKGROUND

The environmental movement in the United States and abroad continues to grow into a mainstream concern with growing demand for environmentally friendlier ("green") products and programs to remove hazardous materials from the residential and workplace environment. PVC (polyvinylchloride) and formaldehyde-based laminate worksurfaces and components are now being removed from many applications due to their toxic nature. Many businesses and organizations are taking aggressive action to remove PVC and formaldehyde-based products from the interior workplace and product fines.

The demand continues to grow for "green" products to replace petrochemical plastics and hazardous polymer. This demand is driven by environmental awareness and by the architectural and building communities based on making interior environments healthier. Materials commonly used in many architectural, institutional, and commercial applications for vertical and horizontal surfacing products are primarily derived from PVC and melamine formaldehyde laminates. With growing concerns over the usage of hazardous PVC and formaldehyde in interior applications, there is a need for environmentally friendly alternatives that meet both performance and economic requirements.

Formaldehyde has created serious concerns over interior air quality. Products such as particleboard and high pressure laminates use substantial amounts of formaldehyde in their resinous makeup. In many cases, the formaldehyde is not removed completely from the product and is introduced into interior public or residential closed spaces and may off-gas for an extended time. Formaldehyde has been linked to many health problems and is classified as a known carcinogen. Major corporations have now made public policy statements that they are to remove PVC and formaldehyde from their places of work. Japan has put in legislation creating strict policies inhibiting the usage of PVC and formaldehyde containing products. Similar legislation has been enacted in Europe.

PVC has been classified by many groups as a "poison plastic". Over 7 billion pounds of PVC is discarded every year. The production of PVC requires the manufacturing of raw chemicals, including highly polluting chlorine, and cancer-causing vinyl chloride monomer. Communities surrounding PVC chemical facilities suffer from serious toxic chemical pollution of their ground water supply, surface water and air. PVC also requires a large amount of toxic additives resulting in elevated human exposure to phthalates, lead, cadmium tin and other toxic chemicals. PVC in interior applications releases these toxic substances as volatile organic compounds (VOCs) in buildings. Deadly dioxins and hydrochloric acids are released when PVC burns or is incinerated.

The vast majority of vertical or horizontal decorative surfacing materials are high pressure laminates and thermofoil PVC. Work surfaces, tables, desktops, and many other work surfaces glue a thin high pressure laminate (HPL) (typically 0.050 inch thickness to a wood particleboard adhered with urea formaldehyde glues). Over the last decade, many kitchen cabinets were produced by cutting a medium density fiberboard containing phenol formaldehyde glues into a door shape. A thin PVC sheet or thermofoil was heated and pressed onto this three dimensional shaped door using a membrane press. The resultant door was already finished and resistant to water, but contained high amounts of chlorine. If the cabinets were burned, the off-gassing may create a deadly hydrochloric acid gas for fire fighters or people who may not escape the fire.

Biobased material is seen as an ideal solution in the architectural, institutional, commercial and even residential markets. Despite this, few products have entered the market as a direct replacement for PVC thermofoils used in surfacing and formaldehyde-based laminates. Biorenewable materials are preferred over petrochemically derived plastic products. Bioplastics have been commonly used for various packaging film applications. Primarily PLA (polylactic acid) has been the most commercially successful of these bioplastics. PLA is a hard brittle plastic that is highly mobile or quickly turns into a liquid under open flame conditions. In addition, PLA may not be easily extruded into profile shapes due to its high melt index and unique rheology. Most all of current PLA products are based on creating biodegradability. As one can appreciate, however, it is not always desirable that products in long term commercial applications be biodegradable, even where biorenewability is desired.

"Green" products have long been desired and are coming into the mainstream, but in most cases biomaterials or "green" solutions have come at a high price and typically do not meet the required performance standards. In some cases, people or companies will pay slightly more for a "green" product, but in reality, a "green" product needs to meet performance while being competitive in price. Being "green" is important, but the ability to supply performance at a competitive price is important to commercialization of "green" technologies. It is important that the materials and products within this environment are not harmful to overall health and provide a clean, VOC-free environment. PVC and its additives, along with formaldehyde from laminates and some particleboards, release harmful VOCs into the work place. These VOCs have been classified as potential carcinogens, creating a higher risk of cancer.

Although "green" biodegradable packing materials are moving the global community towards better environment practices, there exists a strong market demand for non-biodegradable biorenewable materials for more permanent applications to replace hazardous or petrochemically-derived products.

Methods known in the art for making final laminates include Low Pressure Laminate (LPL), High Pressure Laminate (HPL) and Continuous Pressure Laminate (CPL) processes. Low pressure is most often used with card-board or particle board, whereas high pressure generally is used with the so-called kraft papers. The sheets or products resulting from the HPL process are generally not self-supportive. They are often bonded, with a suitable adhesive or glue, to a rigid substrate such as particle board or medium density fiber board (MDF). In a continuous pressure laminate process, papers may be fed from a role into a continuous belt press.

Traditional production suffers from drawbacks which are not easily overcome. One problem is that the laminates made in the high pressures or continuous process are so hard, that it is difficult to bend or 'post-form' these sheets. At present, post-forming characteristics are often achieved by either incorporating expensive modifiers like benzoguanamine or acetoguanamine, or by making melamine-formaldehyde resins at elevated pressure, allowing more melamine to react with formaldehyde. The latter process is relatively expensive, and requires pressure vessels. Yet, it may be advantageous if, while keeping the abrasion resistance and chemical resistance properties, the HPL or CPL sheets would be bendable, so they could be made to cover a substrate not only on one side, but in one process step. Another drawback of traditional laminates is the use of formaldehyde, which is known to be a toxic chemical. The resin used to impregnate traditional paper may be a formaldehyde-melamine resin. After curing, the laminate may still release some formaldehyde, which may cause environmental concerns.

SUMMARY

Embodiments of the invention relate to a biolaminate composite assembly, including one or more biolaminate layers, a non-plastic rigid substrate and an adhesive layer in contact with the substrate and the one or more biolaminate layers. The substrate is laminated or formed to the one or more biolaminate layers. Embodiments also relate to methods of making a biolaminate composite assembly.

In one embodiment, a biolaminate structure is provided comprising a first cellulosic layer, a second cellulosic layer, and a first bio-based polymer. The first bio-based polymer impregnates the first cellulosic layer and the second cellulosic layer. The first cellulosic layer and the second cellulosic layer are fused together.

In another embodiment, a biolaminate structure is provided comprising a first layer and a second layer. The first layer comprises a paper substrate impregnated with a bio-based polymer, the bio-based polymer being one of polylactic acid and lactic acid. The second layer is on contact with the first layer.

In yet another embodiment, a method for forming a biolaminate structure is provided. The method includes providing a first paper layer, providing a biobased polymer film layer, and providing a second paper layer. The first paper layer and the second paper layer aer at least partially saturated with a biobased polymer. Saturation may be from the biobased polymer of the biobased polymer film layer or may be from an additional biobased polymer source. The method further comprises fusing the first paper layer, the biobased polymer film layer, and the second paper layer under means of heat and pressure to form the biolaminate structure.

Embodiments also relate to a decorative biolaminate layer, including a clear biopolymer layer, an opaque biopolymer layer and a decorative print layer. The print layer is positioned between the clear layer and opaque layer.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DEFINITIONS

Figure 1:
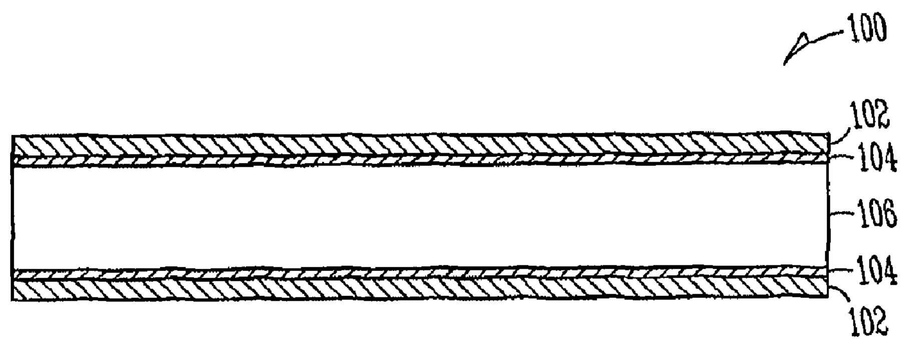
FIG. 1 illustrates a cross-sectional view of a biolaminate composite assembly, according to some embodiments.

As used herein, "additive" refers to a material or substance included in a biolaminate layer or biolaminate composite assembly that provides a functional purpose or a decorative/aesthetic purpose. An example of a functional additive would be a Eire retardant, impact modifier, antimicrobial, UV stabilizer, processing aid, plasticizer, filler, mineral particle for hardness, and other forms of standard plastic or bioplastic additives. A decorative additive would be a colorant, fiber, particle, dye. Additives may also perform both functional and decorative purposes. Additives may be implemented as part of one or more biolaminate layers or as one or more separate layers in a biolaminate composite assembly.

As used herein, "adhesive layer" or "adhesive" refers to a substance that bonds two or more layers in a biolaminate layer or biolaminate composite assembly. Adhesives may include glues. Examples of adhesives include urethane, PVC, PVA, PUR, EVA and other forms of cold press or hot pressed laminating adhesives and methods. The biolaminate and laminates in general are typically adhered to a non plastics or wood/agrifiber composite material using various glues and laminating processes. Glues, such as contact cement, PVA, urethanes, hot melts and other forms of adhesives are commonly used in HPL (high pressure lamination). Although many of these glues may optionally work for embodiments of the invention, low or no VOC-containing glues are preferable in the adhesive system that may be either hot pressed, rolled or cold pressed processes to adhere the biolaminate layer to a substrate.

As used herein, "bioink" refers to a non-petroleum based ink. A bioink may be made of organic material, for example.

As used herein, "biolaminate layers" or "biolaminate" refers to one or more thin layers in contact with a non-plastic rigid substrate, including materials that are derived from natural or biological components. The biolaminate layer may be a multi-layer, such as including multiple layers. One form of biolaminate is made up of a bioplastic or bio-co-polymer, such as PLA (polylactic acid). A biocopolymer, including PLA and other biopolymers, may be used within this invention to create a biolaminate. Biolaminate layers may refer to one or more thin layers including over 50% PLA in combination with optional additives, colorants, fillers, reinforcements, minerals, and other inputs to create a biolaminate composite assembly.

As used herein, "biopolymer" or "bioplastic" refers to a polymer derived from a natural source, such as a living organism. A biopolymer may also be a combination of such polymers, such as in a mixture or as a copolymer, for example. A biopolymer may be a polymer derived from a natural source, such as a living organism. A biopolymer may be a sugar, for example. Polylactic acid (PLA) and polyhydroxyalkanoate (PHA) may be examples of a biopolymer. Biopolymers may be derived from corn or soybeans, for example. A biopolymer may be a co-polymer or a mixture of more than one biopolymer, such as a mixture of PLA and PHA, for example. Other forms of biopolymers included within the embodiments of the invention (and derived from renewable resources) are polymers including polylactic acid (PLA) and a class of polymers known as polyhydroxyalkanoates (PHA). PHA polymers include polyhydroxybutyrates (PHB), polyhydroxyvalerates (PHV), and polyhydroxybutyrate-hydroxyvalerate copolymers (PHBV), polycaprolactone (PCL) (i.e. TONE), polyesteramides (i.e. BAK), a modified polyethylene terephthalate (PET) (i.e. BIOMAX), and "aliphatic-aromatic" copolymers (i.e. ECOFLEX and EASTAR BIO), mixtures of these materials and the like.

As used herein, "contacting" refers to physically, mechanically, chemically or electrically bringing two or more substances together or within close proximity. Contacting may be mixing or dry blending, for example.

As used herein, "forming" or "formed" refers to contacting two or more layers of material, such that an adherent semi-permanent or permanent bond is formed. Examples of forming include thermoforming, vacuum forming, linear forming, profile wrapping or a combination thereof.

As used herein, "heating" refers to increasing the molecular or kinetic energy of a substance, so as to raise its temperature.

As used herein, "laminate" or laminating" refers to contacting two or more layers of material using heat and/or pressure to form a single assembly or multilayer. Laminating may be accomplished with the use of an adhesive between the layers or by thermally fusing without the use of an adhesive, for example.

As used herein, "mixture" refers to a composition of two or more substances that are not chemically combined with each other and are capable of being separated.

As used herein, "non-biodegradable" refers to a substance that is non-biodegradable for a significant amount of time. A non-biodegradable material may not substantially degrade after about 5 years, after about 10 years, after about 20 years or after about 30 years, for example.

As used herein, "non-plastic rigid substrate" refers to wood, wood plastic, agrifiber, or mineral fiber composite panel primarily consisting of a particle, fiber, flake, strand or layer that is thermally pressed with a small amount of resin to produce a panel of sufficient strength for furniture and other building products requirements. A non-plastic rigid substrate may include some plastic, but include non-plastic materials, such as a wood or agrifiber plastic composite in an extruded or compressed sheet form. The non plastic rigid substrate may be a VOC-free particle board or MDF (medium density fiberboard) and preferably derived from rapidly renewable resources such as wheat straw or other biofiber or agricultural based fibers. Other non-plastic rigid substrates may include metal, wood particleboard, agrifiber particleboard, plywood, OSB (orientated strand board), gypsum board, sheet rock, hardboard (such as Masonite), cement or cement board and other rigid substrates. Non-plastic rigid substrates may include paper-based boards, cellulosic substrates (or other organic fibers), cellulose paper composites, multilayer cellulose glue composites, wood veneers, bamboo or recycled paper substrates. Examples of agrifiber particleboard include wheatboard such as MicroStrand produced by Environ Biocomposites Inc. Materials such as particleboard, medium density fiberboard, high density fiberboard, plywood, and OSB are commonly used composite building panels that provide a good substrate for high pressure laminates. Due to environmental pressures many of the wood composite panels that in the past were glued with formaldehyde based resins, such as urea form and phenol form, are being replaced with low or no VOC glues in the forms of urethane or methyl diisocyanide. Over the past decade, concerns over wood supplies have spurred the development of new fiber panels from more rapidly renewable resources including many agrifibers such as wheat straw, rice straw and other cereal grain straws.

As used herein "PLA" or "polylactic acid" refers to a thermoplastic polyester derived from field corn of 2-hydroxy lactate (lactic acid) or lactide. The formula of the subunit is: —[O—CH(CH3)-CO]— The alpha-carbon of the monomer is optically active (L-configuration). The polylactic acid-based polymer is typically selected from the group consisting of D-polylactic acid, L-polylactic acid, D,L-polylactic acid, meso-polylactic acid, and any combination of D-polylactic acid, L-polylactic acid, D,L-polylactic acid and meso-polylactic acid. In one embodiment, the polylactic acid-based material includes predominantly PLLA (poly-L-Lactic acid). In one embodiment, the number average molecular weight is about 140,000, although a workable range for the polymer is between about 15,000 and about 300,000.

As used herein, "thermoforming" may refer to forming with the use of heat. Thermoforming may include the step of positioning a film or layer over the surface of a shaped substrate by means of a membrane press using heat and a bladder that presses and forms the film or layer over a complex three dimensional shape or two or more surfaces of a substrate. A thermally activated adhesive may initially be applied to the three dimensional substrate prior to heat forming the thin film or layer onto the surface. Thus the heat and pressure both form the layer onto the substrate shape and activate the adhesive layer at the same time.

DETAILED DESCRIPTION

The following detailed description includes references to the accompanying drawings, which form a pan of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

INTRODUCTION

A biolaminate composite is provided. The biolaminate composite is flexible and 3D formable. Generally, the biolaminate composite comprises one or more biolaminate layers with at least one of the biolaminate layers compromising polylactic acid. In some embodiments, the at least one biolaminate layer may further comprise a natural wax such as soy wax. The one or more biolaminate layers may be formable over a rigid non-plastic substrate to form a biolaminate composite assembly. Embodiments of the present invention describe a biolaminate derived from bioplastic, biocopolymer or biocomposites products, assemblies, and systems that provide a biosolution system to replace formaldehyde-based laminates and PVC products. In addition, embodiments of the invention provide an economically competitive solution to large commodity products.

Various embodiments are provided that exhibit differing properties. In some embodiments, at least one of the biolaminate layers may include a plastic and a mineral and be suitable for use as a wear layer. In other embodiments, two cellulose layers may be provided with the polylactic acid layer being provided therebetween. In other embodiments, an intumescent layer may be provided in the biolaminate composite such that the composite exhibits fire retardant properties.

Embodiments relate to a product and methods for making a biolaminate assembly utilizing a saturated or resin impregnated paper layer, in particular a decorative surfacing laminate layer. The layer may include at least one cured layer of a polylactic or lactic acid saturated paper. The top or surface layer may include a decorative printed or colored paper. In another example, melamine-formaldehyde resin impregnated papers may be put on top of a stack of phenol-formaldehyde resin impregnated papers and subsequently cured. Generally, such biolaminate assembly may include a first cellulosic layer and a second cellulosic layer. A first bio-based polymer, such as PLA, may be provided between the first cellulosic layer and the second cellulsoic layers. Fusing of the first cellulosic layer, the first bio-based polymer, and the second cellulosic layer may impregnate the cellulosic layers with the first bio-based polymer substantially throughout the cellulosic layers.

Embodiments of this invention use unique bioplastics in combination with optional lower cost bioadditives that allow faster processing than conventional PVC and laminates and allow the products to be sold competitively with PVC thermofoils and high pressure laminates while being produced from rapidly renewable resources and providing no VOC contribution to the interior environment.

Generally, embodiments of the biolaminate composite may relate to a biolaminate composite assembly and/or a biolaminate surface system. Such biolaminate surface system may comprise a bioplastic, bio-copolymer, and biocomposite system in the form of a biolaminate layer that is laminated or thermoformed to a rigid non-plastic substrate by means of a glue line or adhesive layer. The biolaminate system also may include matching profile extrusion support products derived from the same composition and processing method.

In some embodiments, a decorative biolaminate composite may be provided. The decorative biolaminate may have a natural three dimensional depth of field as compared to PVC thermofoils or high pressure laminates based on the semi-transparent nature of the biopolymers providing unique aesthetic and similar performance to that of other surfacing materials.

Further, a biosolution option is provided that is derived from rapidly renewable agricultural materials and designed for longer term applications and products typically used in interior applications where concerns over clean air and encouragement of environmentally friendly products are heightened.

Thus, a biolaminate composite assembly is described including one or more biolaminate layers that are adhered by means of laminating or thermoforming onto a non-plastic rigid substrate. The resultant biolaminate composite assembly is designed to be used for desktops, tabletops, worksurfaces, wall panels, wall coverings, cabinet doors, millwork, and other decorative laminated products. The biolaminate surface layer can be contacted with various nonplastic substrates by means of thermoforming for three dimensional components or flat laminated. The biolaminate layer may include one or more layers of a biopolymer, biocopolymer, biocomposite materials or a combination thereof. The biopolymer or modified biopolymer may include primarily a PLA or PHA or blend thereof. The biolaminate layer may include a biocopolymer wherein the biocopolymer includes an additional biopolymer or bioplastic or a petrochemical based plastic or recycled plastic. The biolaminate layer may include a biocomposite wherein a biopolymer is blended with various fillers, reinforcement, functional additives, fire retardants, and other such materials for aesthetic or functional needs.

Composite Assembly

Referring to FIG. 1, a cross-sectional view 100 of a biolaminate composite assembly is shown, according to some embodiments. A non-plastic rigid substrate 106 may be in contact with an adhesive layer 104. The adhesive layer 104 may be in contact with one or more biolaminate layers 102. The non-plastic rigid substrate 106 may also be in contact with the layers 102, for example. A biolaminate layer 102 may include multiple layers.

Accordingly, the composite assembly may include a biolaminate layer and one or more other layers. The one more other layers may also be biolaminate layers. Some possible embodiments for these layers are described below. It is to be appreciated that while these layers may be discussed as separate layers from the biolaminate layer, the components or functionality of these layers may alternatively be provided in the biolaminate layer.

Biolaminate Layer

At least one biolaminate layer of the biolaminate composite assembly may include primarily a biopolymer including PLA, PHA or similar biopolymers. The biopolymer, biocopolymer and biolaminate (or biolaminate layer or biolaminate composite assembly) may include one or more additives. Suitable additives include one or more of a dye, pigment, colorant, hydrolyzing agent, plasticizer, filler, extender, preservative, antioxidants, nucleating agent, antistatic agent, biocide, fungicide, fire retardant, heat stabilizer, light stabilizer, conductive material, water, oil, lubricant, impact modifier, coupling agent, crosslinking agent, blowing or foaming agent, reclaimed or recycled plastic, and the like, or mixtures thereof. In certain embodiments, additives may tailor properties of the biolaminate composite assembly for end applications. In one embodiment, the biopolymer may optionally include about 1 to about 20 wt-% of an additive or additives. Other additives may include other forms of synthetic plastics or recycled plastics such as polyethylene, polypropylene, EVA, PET, polycarbonate, and other plastics to enhance performance and add recycled content if desired or required. In one embodiment, the biolaminate layer may comprise 100% biorenewable biopolymer. Binders may be added to the biolaminate layer, such as EVA.

Additives may be present in the at least one biolaminate layer comprising PLA or similar biopolymer or may be provided in a separate layer within the composite assembly. Such additives may be functional or decorative, for example. Any discussion of such additives as present within the biolaminate layer or as provided in a separate layer is intended for the purposes of illustration only and it is to be appreciated that such discussion may equally apply to the other embodiment.

Bioplasticizers, biolubricants, fire retardants, decorative and functional fibers, decorative and functional fillers, colorant systems and surface textures may be integrated into a bioplastic, biocopolymer, or biocomposite (as part of the biolaminate layer or layers or assembly) producing an extrudable material that may be formed into a biolaminate sheet and matching profile extrusion components. For example, the biolaminate layer may include about 50% to about 95% polylactic acid polymer from corn or other natural materials in combination with a bioplasticizer/biolubricant and other additives.

The biolaminate layer may include a biopolymer such as PLA blended with plasticizers to form a flexible biolaminate sheet that also can be printed on the surface or reversed printed on a clear flexible biolaminate. The flexible biolaminate can be laminated onto a sheet rock wall as a replacement for PVC vinyl wall covering. In this case, an optional nonwoven material may be coextruded onto the backside of the flexible biolaminate to add additional strength for such application. The flexibility of the biolaminate layer may be comparable to that of a PVC sheet.

The biolaminate layer of the biolaminate composite assembly may also include a plasticizer or impact modifier to produce a more flexible biolaminate or softer surface biolaminate layer. Preferably, the plasticizer has a boiling point of at least 150° C. Examples of plasticizers that may be used include, but are not limited to, glycerine, polyglycerol, glycerol, polyethylene glycol, ethylene glycol, propylene glycol, sorbitol, mannitol, and their acetate, ethoxylate, or propoxylate derivatives, and mixtures thereof. Specific plasticizers that may be used include, but are not limited to, ethylene or propylene diglycol, ethylene or propylene triglycol, polyethylene or polypropylene glycol, 1,2-propandiol, 1,3-propandiol, 1,2-, 1,3-, 1,4-butandiol, 1,5-pentandiol, 1,6-, 1,5-hexandiol, 1,2, 6-, 1,3,5-hexantriol, neopentylglycol trimethylolpropane, pentaerythritol, sorbitol acetate, sorbitol diacetate, sorbitol monoethoxylate, sorbitol dipropoxylate, sorbitol diethoxylate, sorbitol hexaethoxylate, aminosorbitol, trihydroxymethylaminomethane, glucose/PEG, the product of reaction of ethylene oxide with glucose, trimethylolpropane, monoethoxylate, mannitol monoacetate, mannitol monoethoxylate, butyl glucoside, glucose monoethoxylate, alpha-methyl glucoside, the sodium salt of carboxymethylsorbitol, polyglycerol monoethoxylate and mixtures thereof. An impact modifier maybe in the form of a plasticizer or in the form of an elastomer material. Impact modifying elastomeric materials include, but are not limited to EVA, EMA, TPE, metalecene and other similar forms of elastomers.

Natural or biobased plasticizers may be also used including soybean wax, natural waxes, glycerine, natural esters, citric esters, soybean oils, epoxified or heat embodied soybean oils and other similar plasticizers.

Other additives, such as congregated vegetable oils, glycerine (by-product of biodiesel production), soybean wax and other lower cost biomaterials, may be added as an additive in lower percentages to create a combination of lubricant action and bioplasticization of the biopolymer, while improving the lubrication within the profile die process. These forms of material lower the cost of the end product while maintaining the environmentally friendly bio-composition. These forms of material also may assist in improved dispersion of various fire retardants, fillers, and fibers while improving the impact strength of the overall system.

The addition of a low molecular weight bioplasticizers/lubricant system within the embodiments of the present invention allow for better loading of these forms of powders into the biopolymer matrix which provides better processing parameters and increases flexibility and impact resistance. Examples of plasticizers which may be used according to the invention are esters comprising: (i) an acid residue comprising one or more of: pthhalic acid, adipic acid, trimellitic acid, benzoic acid, azelaic acid, terephthalic acid, isophthalic acid, butyric acid, glutaric acid, citric acid or phosphoric acid; and (ii) an alcohol residue comprising one or more aliphatic, cycloaliphatic, or aromatic alcohols containing up to about 20 carbon atoms. Further, non-limiting examples of alcohol residues of the plasticizer include methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol. The plasticizer also may comprise one or more benzoates, phthalates, phosphates, or isophthalates. In another example, the plasticizer comprises diethylene glycol dibenzoate, abbreviated herein as "DEGDB". Examples of bioplasticizers include, but not limited to, hydrogenated vegetable oils, epoxified or congregated vegetable oils, drying oils derived from vegetable oils, mineral oils, natural waxes, polylactocaptone, citric acid and others. The resultant material of a PLA in combination with a plasticizer or bioplasticizer is considered to be a bio-co-polymer system. Lower loadings of a bioplasticizer may be used to maintain a rigid profile or sheet extrusion component and high loadings will further impart additional flexibility. Flexible or higher impact properties may be required by the varying product applications.

All forms of plasticizer additions to the biolaminate layer or assembly may assist in both impact resistance and in making the biolaminate layer more flexible in nature to match the performance of flexible PVC film products. Although various plasticizers may be used for a flexible biolaminate or for impact modification, it may be preferred to use a biobased plasticizer to maintain the biobased environmental position of the product.

In some embodiments, fillers, including synthetic materials, natural minerals, and biomaterials, may be added to the biopolymer of the biolaminate layer. Such fillers include biofibers, proteins, starches, vegetable oils, natural fatty acids and other materials. Fibers and minerals typically help in the viscosity and processing of various plastics.

In some embodiments, the biolaminate layer may include further components adding other functionality to the layer. For example, the biolaminate layer may include quartz or other minerals and fibers.

Cellulosic Layers

In some embodiments, resin impregnated paper substrate or backer layer may be provided as part of or in contact with the one or more biolaminate layers of the biolaminate assembly. The layer may include forms of polylactic acid or other biopolymers to create a biobased and environmentally friendly alternative to formaldehyde based high pressure laminates. Embodiments of the invention may utilize either molten PLA or forms of processed lactic acid liquids that are impregnated into the one or more layers of paper. The saturated paper or paper layers may be heat formed into a decorative or functional laminate. The one or more layers may be contacted with heat and/or pressure sufficient to cure or polymerize the resin. In some embodiments, additional cellulosic layers impregnated with a bio-based polymer may be provided to form a thicker biolaminate structure.

In a first cellulosic embodiment, the biolaminate assembly may include a first cellulosic layer and a second cellulosic layer. A first bio-based polymer, such as polylactic acid or lactic acid, may be provided between the first cellulosic layer and the second cellulsoic layers. Fusing of the first cellulosic layer, the first bio-based polymer, and the second cellulosic layer may impregnate the cellulosic layers with the first bio-based polymer substantially throughout the cellulosic layers.

In a second cellulosic embodiment, the biolaminate assembly may include a first layer and a second layer in contact with the first layer. The first layer may be a paper substrate impregnated with a bio-based polymer such as polylactic acid or lactic acid. In various embodiments, the second layer may be a paper substrate impregnated with a bio-based polymer, may be a biobased film including a PLA sheet, or may be a clear PLA surface layer. The biolaminate assembly exhibits substantially no formaldehyde emission and may be suitable for replacement for high pressure laminates.

Embodiments of the present invention include biolaminate assemblies utilizing a saturated paper with substantially no formaldehyde emission. Various other layers may be provided with cellulosic embodiments. For example, decorative layers (including printed layers), overlay layers, wear layers, or other functional layers may be provided. An example decorative layer comprises a film layer, such as a PLA film layer, reverse printed with an image. The printed PLA film layer may then be provided within the biolaminate composite, such as over the first and second cellulosic layers. Overlay papers may be reasonably transparent when impregnated and cured. Either a clear polylactic or bioplastic or bioplastic/petrochemical plastic blend may be fused onto a biolaminate layer or a plain paper saturated with PLA or LA may be thermally fused onto the surface, also providing a good transparent layer, for example. Suitable overlay layers may include a thermoset and thermoplastic standard overlay, a mineral plastic overlay, a bioplastic overlay, or a wear layer surface overlay.

Accordingly, various forms of polylactic acids may be saturated into papers for the production of a biolaminate layer. Further, additives may be contacted with the polylactic acid as described above. Other bioresins and biobased polymers also may be used for paper saturating and produced into a single or multilayer laminate layer as an alternative to petrochemical formaldehyde based laminates. For example, biobased resins such as polyurethanes, polyesters, nylong and monomers such as polyols, organic acids and other similar biobased resins may be used to saturate papers for laminates. New generations of protein polymer chemistry also may be included such as Zein proteins, soybean protein and other bioresin or bioadhesive blends. Such biobased adhesives or polymers may be used in a liquid form either in their natural liquid state or by heat melting into various viscosity liquids in which the paper may be saturated and eventually cured in a single or multilayer biolaminate structure. Other new biopolymers derived from dextrose such as 3HP chemical platforms that lead to acrylic acid and acrylic polymers may also provide a biobased resin that may be used by itself or in combination with other biopolymers including PLA and the like.

Currently, paper from wood may be the primary source of paper used for a cellulosic biolaminate composite. However, any suitable woven or nonwoven cellulosic paper may be used. Suitable papers include, for example, plain paper, kraft paper, treated paper, wood based paper, recycled papers, decorative paper, printed paper, fiber reinforced papers, glass fiber reinforced paper, thin wood veneers, fire retardant paper, chemically treated paper, ph adjusted papers, or a combination thereof. The cellulosic paper may be a biobased paper from a renewable plant fiber such as hemp, baggase, wheat straw, and corn stover In one embodiment of a biolaminate including a cellulosic layer, four laminate layers are provided and fused and topped with a textured release paper. The bottom layer is a PLA layer, the second layer is a decorative paper, the third layer is a PLA layer, and the fourth layer is a wear layer. Heat and pressure may be used to fuse the layers, thereby saturating and impregnating the decorative print paper layer with PLA. If provided over a substrate such as a wood composite substrate before application of heat and pressure, the heat and pressure operate to fuse the layers into the wood composite substrate. The textured release paper is provided over the wear layer.

Surface Wear Layer

A biolaminate surface layer may be provided having wear layer characteristics. Such biolaminate surface wear layer may include natural fine quartz materials for specific high durability surfacing applications, while still maintaining a translucent material. Various natural minerals such as silica (natural quartz), alumina, calcium carbonate, and other minerals may be used in the production of flooring products to provide a higher degree of wear resistance and hardness. These wear resistant materials may be in the forms of medium particles that may be seen by the eye as decorative and functional particles. Such fine powder material becomes clear or semi-translucent in the bio-co-polymer matrix or in nano-sized form within the biolaminate layer. The natural minerals may be included in a surface layer of a multilayer biolaminate layer or within a single biolaminate layer positioned near the surface of a biolaminate composite assembly.

The "nanoquartz" technology may provide good performance and durability of the surface. Natural quartz or silica sand in various particle sizes from nano-sized to larger sizes may be used in decorative applications and be added to the biolaminate system. Although, within embodiments of this invention, other natural minerals may be used, natural quartz is one of the hardest materials in nature. A biolaminate laminate assembly integrating quartz may also provide a lower cost option for expensive granite and other solid surfacing composites for kitchen countertops, tables, and other higher performance areas. These forms of biolaminate layers may be either flat laminated or thermoformed into three dimensional worksurface for kitchen and other forms of countertop applications.

Surface Wear Layer with Decorative Layer

In one embodiment, a two layer biolaminate composite may be provided including a clear quartz loaded surface layer thermally fused to an opaque biolaminate layer with printing encapsulated between the layers. In the case of a multilayer biolaminate layer, the layers of the biolaminate may be fused together by thermal processing with pressure or by means of a separate glue line or adhesive layer.

Fibrous Layer

The biolaminate layer may include a biopolymer blended with natural fibers such as wheat, rice, and other similar forms of hydrophilic fibers. This, in addition to its organic nature, provides both higher degrees of wear resistance and improves char promotion in creating fire rated laminates and matching profile extrusion components. A fire retardant may be included in one or more biolaminate layers, in the adhesive layer, in the non-plastic rigid substrate or any combination with a biolaminate composite assembly.

A biolaminate layer including natural fibers or fillers may be desired due to their environmentally nature and for the fact that they provide a random geometry within the clear or semitransparent matrix yielding a natural look compared to an ordered "man-made" appearance commonly found in solid surface or repeating pattern high pressure laminate images. Natural fiber materials may include, but are not limited to: wheat straw, soybean straw, rice straw, corn stalks, hemp, baggase, soybean hulls, oat hulls, corn hulls, sunflower hulls, paper mill waste, nut shells, cellulosic fiber, paper mill sludge, and other agriculturally produced fibers. Wheat and rice fiber may be preferred for their shiny surfaces wherein these types of fiber are uniquely ground into long narrow strands and not into a fine filler powder as typically done in wood plastic composites. Although natural fibers may be preferred, other fibers, particles, minerals and fillers may be used, such as fiber glass wherein the bio-co-polymer may also impregnate the glass fibers within this process. Other forms of biobased materials may be used, such as seeds, proteins and starches, to expand the natural aesthetic nature of the biolaminate and matching extrusion profiles (such as edgebanding and other support components).

Fire Retardant Layer

The biolaminate layer may include fire retardants commonly used in dry fire extinguishers, such as ammonia phosphorus in combination with mica and silica. Such fire retardants provide good performance in a biolaminate composite assembly due to their pH and lack of reactivity with a bio-co-polymer system. These provide a high degree of flame suppression and induces char. Other fire retardants may be used, preferably non-halogenated retardants including alumina thyrate and magnesium hydroxides.

Additional materials may be added to the fire retardant bio-co-polymer (PLA/bioplasticizer) that reduces liquid mobility during burning, improving charring that insulates the material from heat during burning, and provides a higher degree of material integrity during burning as to hold its shape. Examples of additional char promoters include, but are not limited to: nanoclay, zinc borate, intumescent fire retardants, agricultural flour, wood flour, starch, paper mill waste, synthetic fibers (such as fiberglass or powders), minerals, and other materials. Other forms of drip suppressants, such as polytetrafluoroethylene, may also be used to reduce liquid mobility and be synergistic with the char promoters. Other forms of char promoters also may assist in stopping the liquid mobility or provide drip suppression, such as natural or synthetic rubbers. Such char promoters also provide additional flexibility or improved impact resistance for the biolaminate or matching profile biosolutions.

The resultant material has a very good char and low flame spread with very minimal smoke generation as compared to the high smoke producing PVC laminates that also are highly toxic. In regards to small amount of smoke generated, the smoke is semitransparent white or not seen at all.

Decorative Layer

The surface layer of a biolaminate composite assembly may include a clear or semitransparent biolaminate layer in contact with a printed layer wherein various forms of printing methods and inks or dyes can be used to apply a decorative or customized feature on the printed layer. A suitable is a lactic acid based ink also derived from corn to provide a truly environmental biolaminate product.

The biolaminate composite assembly may be a decorative composite, including a clear biopolymer layer, an opaque biopolymer layer; and a decorative print layer. The print layer may be positioned between the clear layer and opaque layer. The clear layer may be textured. The layers may be optionally fused together.

The surface layer of a biolaminate composite assembly may include a clear or semitransparent film or layer that is direct printed on the top or outer surface and optionally liquid coated over the top to protect the printed surface and for improved surface characteristics. Liquid laminating may be accomplished by roll coating, rod coating (such as Mery rod coating), spray coating, UV cured coating systems and other standard coating systems.

The surface layer of the biolaminate composite assembly may include reverse direct printing wherein the print layer is positioned between the biolaminate and adhesive layer. This positioning allows the entire biolaminate clear layer to be a wear layer that can be refinished. In contrast, traditional high pressure laminate layers quickly wear through the pattern and can not be refurbished or refinished.

A decorative pattern may be printed on one or more sides of a biolaminate layer. The pattern may be on an outer surface or may be on an inner surface and visible to a user through a translucent biolaminate layer. Printing may include direct printing, reverse printing, digital printing, dye sublimation rotor gravure or other methods. Printing may occur at any suitable time, including before forming or laminating or after forming or laminating. Printing may be performed on one or more layers, pressed or laminated together, before the subsequent forming or laminating to a substrate. The printed layer may be in contact with the adhesive layer or may be on an outer surface. A protective, clear layer may be further contacted to an outer printed surface. Printing inks may include inks that provide sufficient adhesion to the biolaminate layer and can maintain adhesion in secondary heat laminating applications. Certain solvent based inks may not maintain sufficient adhesion during hot laminating processes. In addition the ink type needs to have some degree of flexibility as not to crack during hot thermofoiling processes and applications. UV inks are more environmentally friendly than solvent and are more preferred, but may not have sufficient flexibility or adhesion. New corn based inks derived from forms of lactic acid from corn are most preferred as to maintain the best environmental position and also provides improved adhesion while maintaining flexibility for such final applications and hot laminating processes.

The surface layer of the biolaminate layer may include two layers of biopolymer films wherein the top layer is a clear biolaminate film layer with a top surface texture and the second bottom layer is an opaque (i.e., white) biolaminate film layer with a print layer between the two biopolymer film layers in which the biopolymer film layers are thermally fused together or laminated by means of an adhesive. Once the multilayer decorative laminate is produced, it can be laminated in a manner similar to that of high pressure laminates onto various non-plastic rigid substrates including wood or agrifiber composite panels.

Colorant System

The biolaminate layer or layers within the biolaminate composite assembly may include a colorant system. Colorants include, but are not limited to: pearls, particle granites, solids, dyes, "glow in the dark" additives, swirls, blends and other forms of decorative colorant systems. Colored minerals, fibers, and other forms of unique color and unique geometry particles may be integrated with the color into the biolaminate layer to provide solid surface aesthetics without requiring a printing layer.

Suitable inorganic colorants include metal-based coloring materials, such as ground metal oxide colorants of the type commonly used to color cement and grout. Such inorganic colorants include, but are not limited to: metal oxides such as red iron oxide (primarily $Fe_2O_3$), yellow iron oxide ($Fe_2OHO$), titanium dioxide ($TiO_2$), yellow iron oxide/titanium dioxide mixture, nickel oxide, manganese dioxide ($MnO_2$), and chromium (III) oxide ($Cr_2O_3$); mixed metal rutile or spinel pigments such as nickel antimony titanium rutile ($\{Ti,Ni,Sb\}O_2$), cobalt aluminate spinel ($CoAl_2O_4$), zinc iron chromite spinel, manganese antimony titanium rutile, iron titanium spinel, chrome antimony titanium ruffle, copper chromite spinel, chrome iron nickel spinel, and manganese ferrite spinel; lead chromate; cobalt phosphate ($CO_3(PO_4)_2$); cobalt lithium phosphate ($CoLiPO_4$); manganese ammonium pyrophosphate; cobalt magnesium borate; and sodium alumino sulfosilicate ($Na_6Al_6Si_6O_{24}S_4$). Suitable organic colorants include, but are not limited to: carbon black such as lampblack pigment dispersion; xanthene dyes; phthalocyanine dyes such as copper phthalocyanine and polychloro copper phthalocyanine; quinacridone pigments including chlorinated quinacridone pigments; dioxazine pigments; anthroquinone dyes; azo dyes such as azo naphthalenedisulfonic acid dyes; copper azo dyes; pyrrolopyrrol pigments; and isoindolinone pigments. Such dyes and pigments are commercially available from Mineral Pigments Corp. (Beltsville, Md.), Shephard Color Co. (Cincinnati, Ohio), Tamms Industries Co. (Itasca, Ill.), Huls America Inc. (Piscataway, N.J.), Ferro Corp. (Cleveland, Ohio), Engelhard Corp. (Iselin, N.J.), BASF Corp. (Parsippany, N.J.), Ciba-Geigy Corp. (Newport, Del.), and DuPont Chemicals (Wilmington, Del.).

The colorant may be added to the biocomposite layer in an amount suitable to provide the desired color. In some embodiments, the colorant is present in the particulate material in an amount no greater than about 15% by weight of the biocomposite matrix, in an amount no greater than about 10%, or in an amount no greater than about 5%. Preferably, colorants use biopolymer carriers to maintain the biobased characteristics of the biolaminates. Although standard color carriers, such as EVA, do not contain hazardous materials, it is preferred to use natural polymers as color carriers. A three dimensional appearance due to utilizing a clear biopolymer may be achieved within the embodiments of the present invention.

The surface layer of a biolaminate composite assembly may include a solid opaque colorant with optional fibers, fillers, or minerals to add decorative value to the product. The color and texture may be consistent throughout the product similar to that of a thin solid surface material.

Example Composite Assemblies

In one example of a biolaminate composite assembly, the top layer may be a biolaminate loaded with natural quartz to provide a high wear surface. The second layer may be a top printed white sheet of biolaminate. In this case, the quartz biolaminate layer may be fused together with the printed bottom layer by means of heat and pressure or by means of a clear adhesive.

In one embodiment, a multiple layer biolaminate composite may be designed for unique aesthetic function. Multiple clear layers of the biolaminate may be printed with differing patterns and colors so that after multilayers of printed clear biolaminates are fused together, they provide a unique three dimensional depth of field in the image or pattern. Such an aesthetic depth of field is not found in HPL or PVC products, which are typically both opaque materials with printing on the surface. The multilayer printed biolaminate may utilize clear layering with an optional white back layer that provides for high quality and excellent image depth.

Substrates

The biolaminate composite or any layer thereof may be laminated to a substrate. Such substrate may include non plastic substrates such as medium density fiberboard, particle board, agricultural fiber composites, plywood, gypsum wall board, wood or agrifiber plastic substrates and the like. Ond suitable substrate is a formaldehyde free wheatboard composite that is rapidly renewable. Further non plastic substrate may typically be a rigid wood or agrifiber composite commonly used for furniture, cabinet, millwork, laminate flooring, store fixture and other such applications. In most of these types of applications a fiat sheet may be used in which the biolaminate may be adhered to the surface and backside for balanced construction. In one embodiment, forms of profiles may be used in which MDF made from either wood or agrifiber can be machined into a three dimensional linear shape for millwork applications and the biolaminate layer may be formed and laminated onto this surface A substrate may also be a wood or agrifiber mixed with plastic that is extruded into a final shape such as a millwork or window profile in which the biolaminate may then be formed and adhered to the surface by means of heat and a glue fine. The biolaminate layer in this embodiment may be either functional or decorative.

Methods of Making the Biolaminate Composite

Figure 2:
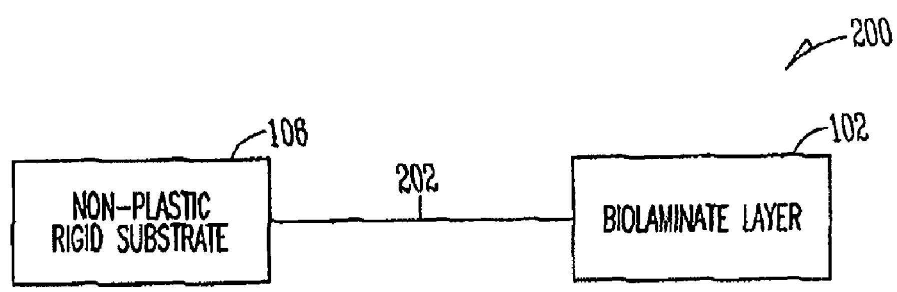
FIG. 2 illustrates a block flow diagram of a method of making a biolaminate composite assembly, according to some embodiments.
Figure 3:
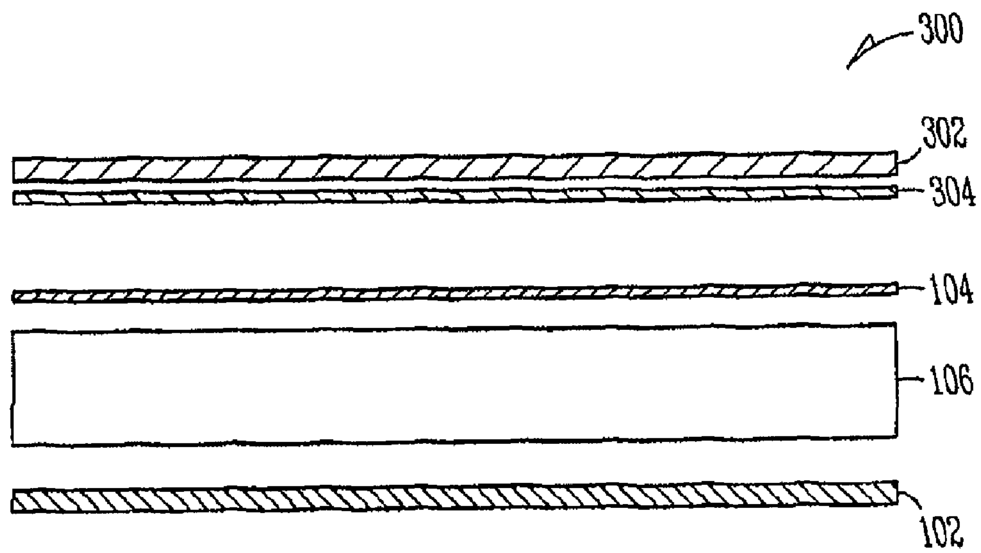
FIG. 3 illustrates an expanded view of a biolaminate composite assembly, according to some embodiments.

Referring to FIG. 2, a block flow diagram 200 of a method of making a biolaminate composite structure is shown, according to some embodiments. A non-plastic rigid substrate 106 may be formed or laminated 202 with one or more biolaminate layers 102. Forming 202 may include thermoforming, vacuum forming, thermoforming or a combination thereof. Additives may be introduced before, during or after forming 202.

Referring to FIGS. 3-6, an expanded view (300, 400, 500, 600) of a biolaminate composite assembly is shown, according to some embodiments. A substrate 106, such as a rigid non-plastic substrate, may be contacted with a clear biolaminate layer 302 utilizing an adhesive layer 104 on a first side. The clear biolaminate layer 302 may be in contact with a reverse print layer 304, for example. They may be joined by fusing for example. On a second side of the substrate 106, a second biolaminate layer 102 may be contacted, such as by thermoforming or lamination (see FIG. 3).

Figure 4:
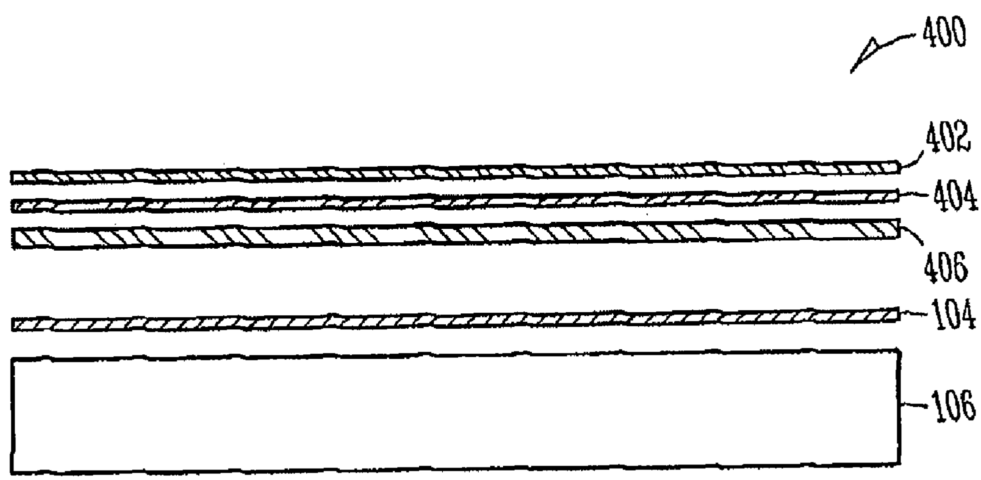
FIG. 4 illustrates an expanded view of a biolaminate composite assembly, according to some embodiments.
Figure 5:
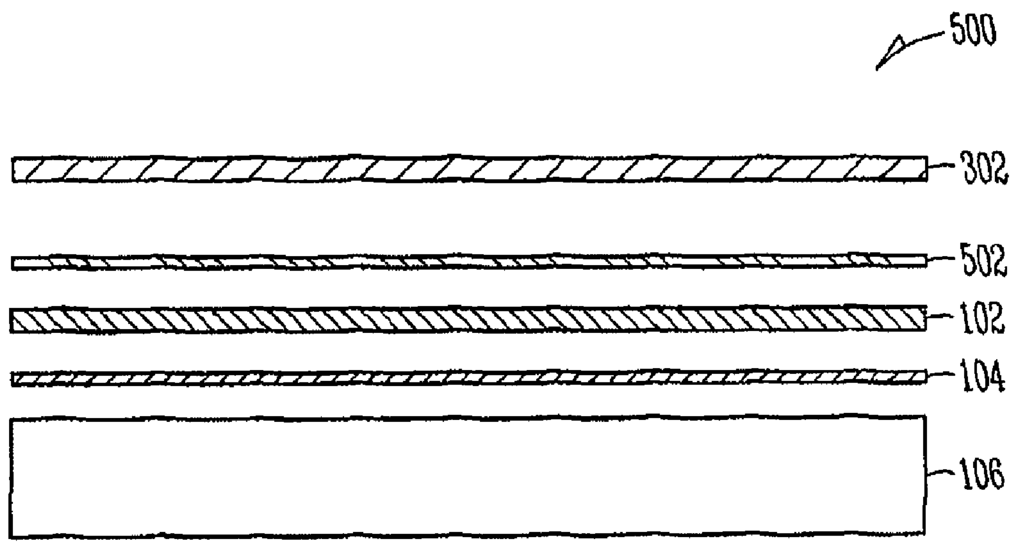
FIG. 5 illustrates an expanded view of a biolaminate composite assembly, according to some embodiments.
Figure 6:
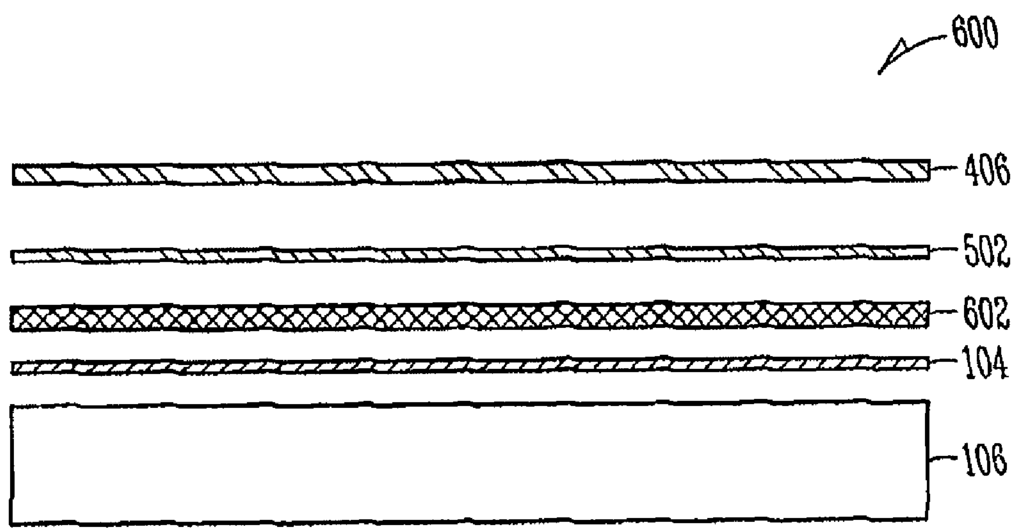
FIG. 6 illustrates an expanded view of a biolaminate composite assembly, according to some embodiments.

A clear biolaminate layer 406 may be contacted with a direct print layer 404 and then protected on an outer surface by a clear protective coating 402, for example (see FIG. 4). A biolaminate layer may include two or more layers, such as a white biolaminate layer 102, a surface biolaminate layer 302 and a print layer 502 in between (see FIG. 5). The surface layer 302 may be loaded with quartz, for example. In another embodiment, a fire retardant may be integrated in a biolaminate layer 602, then direct printed 502 with a decorative layer. A clear biolaminate layer 406 may face an outer surface (see FIG. 6).

Various of these steps will be described in more detail below.

PLA used in the biolaminate layer may be processed above its melting point in extrusion film processing. The PLA used in the biolaminate may also be processed below its melting point in its viscoelastic state and maintain a higher degree of crystallinity in the biolaminate layer. For example, see U.S. patent application Ser. No. 11/934,508, filed Nov. 2, 2007, the disclosure of which is herein incorporated in its entirety. According to the embodiments of the invention, the extrusion process for producing the biolaminate layer may be performed at a temperature significantly lower than the melting point and keeps the PLA in its crystalline state and processes the PLA in its viscoelastic state. In one example, both a flat sheet can be produced, or a matching three dimensional profile such as a matching edgebanding or millwork piece.

U.S. patent application Ser. No. 11/934,508 teaches that PLA in combination with an EVA type or synthetic form of binder allows PLA to be processed below its melting point. In addition, this teaches that fire retardants may be added. In embodiments disclosed herein, the combination of the binder and highly polar PLA makes it difficult to load fire retardant to the required level to reach a class I rating without the material becoming extremely brittle and not meeting the requirements of PVC applications. Although this technique works well for producing a high tolerance profile shape, the addition of EVA is not necessary in these embodiments. Other forms of additives, along with processing at temperatures below the melting point of PLA, may achieve a similar result. Accordingly, embodiments of the invention use various forms of a bioplasticizer/biolubrication system to replace the binder in the above mentioned reference. In addition, the embodiments also show that by increasing shear rate and maintaining a lower processing temperature than the melting point of PLA, a high tolerance profile extrusion can be produced.

When processing the PLA at a specific temperature range, in which the PLA is in an "elastic state" similar to a rubber, the PLA stays in its amorphous state and acts similar to that of various other elastomeric materials. Also in this state, the material is less susceptible to moisture and shear. In fact, in processing it was found that higher shear levels when the PLA is in this elastomeric state provides advantages in profile extrusion and with the addition of various additives. PLA has a melting point of approximately 390° F. The embodiments of this invention teach that with sufficient shear, PLA may be processed at a temperature far lower than its melting point. In this embodiment, the profile extrusion process ranges from about 280 to about 340° F., and more preferably between about 300 to about 320° F. With the addition of high loadings of fillers, higher temperatures may be used, but preferably below the melting point of the PLA.

Biolubricants assist in this low temperature viscoelastic process, such as natural waxes, lignants or plasticizers. Preferably, the wax or plasticizers are based on biobased materials. Embodiments of the present invention describe a two component composition processed below its melting point into a profile extrusion continuous shape using a PLA and a plasticizer or biolubricant may create complex shaped profiles of high tolerance.

At these processing conditions, it may be possible to blend in various additives, fillers, and reinforcement materials in liquid or solid forms in addition adding various other polymeric additives to develop a wider range of end performance qualities for various non-biodegradable profile extrusion applications. The PLA also may be foamed using celuka die systems and a foaming or biofoaming agent to produce light weight profile extrusions. Other fillers maybe added to the solid or foamed profile shape, including wood fiber, wood flour, paper millsludge, agrifibers, cereal straws, minerals, fiberglass fibers, starch, proteins, and other forms of fillers or reinforcement. The resultant bioprofile may be colored throughout to match the biolaminate composite assemblies or printed using the same patterns as other biolaminates. This provides the ability to create a full solution for buildings, offices and commercial building as to allow for aesthetic matching of environmental components in architectural design.

The addition of fillers, either synthetic, natural minerals or biomaterials, may be added to the biopolymer in the elastomeric state. The addition of these materials in the biopolymer elastomeric state allows for processing using much higher shear rates, provides improved dispersion and provides less brittleness in the biopolymer by staying below its melting point and minimizing crystallization of the biopolymer.

As noted, the biolaminate layer or layers within the biolaminate composite assembly may include a colorant system. Colorants may be added directly into the biolaminate layer by mixing colorants with the biocopolymer and/or by coloring the fibers by means of dying or other coloring processes to provide single and multicolored high aesthetic biolaminates and matching profiles.

A biolaminate layer using primarily PLA with optional additives may be sheet extruded to meet the requirements of PVC or HPL decorative surfacing products. The extruded sheet of biolaminate may be processed either above the melting point to achieve a clear amorphous biolaminate or below the melting point in its viscoelastic state to increase its crystallinity. The extruded biolaminate may be extruded in thicknesses ranging from 0.002" to 0.3" and more preferably between 0.005" to 0.030" and most preferred between 0.010" to 0.025". The hot extruded biolaminate clear sheet may then be processed through various rollers for both cooling purposes and to imprint a texture on the surface and backside of the biolaminate. The top surface texture may range from a smooth high gloss to a highly textured flat surface. For worksurface, tables, and most cabinet door applications a gloss level between 10-30 degrees gloss may be preferred as not to show scratching and reduce light reflection. The backside of the biolaminate can also match the topside texture, but it is preferred to have a low flat gloss as to promote adhesion in laminating. Even though the biolaminate material may be clear, the addition of the same or different textures on both sides may make the biolaminate semitransparent and hard to see through.

After the clear biolaminate has been extruded, it may be optionally used in this form as a clear film finishing over raw wood or agrifiber composites as a direct replacement for liquid finishing providing a VOC environmental and high performance finish for such products.

In some embodiments, the semitransparent biolaminate may be direct printed on the topside, reverse printed on the backside or printed within layers of the biolaminate using various printing methods or inks (as discussed earlier). Methods of printing include, but are not limited to inkjet, rotor gravure, flexographic, dye sublimation process, direct UV inject printing, screen printing using standard or UV inks, and other means of printing. A bioink may be utilized in the printing process. One method for printing may be to heat either the ink or the substrate prior and after printing to maximize adhesion of the printing inks. In some cases, a primer layer may be utilized between the biolaminate surface and the printing layer to improve adhesion of these layers.

A printing process may be used to print a single layer clear biolaminate in which the print is reversed printed on the back side which may be a flat texture. The printing process wets out the flat surface and increases the clarity of the biolaminate. Heat laminating the biolaminate increases its amorphous nature. This may cause the biolaminate to become more clear, resulting in a higher quality of print. Because the printing is on the back side of the clear biolaminate, the biolaminate provides a thicker wear layer than PVC products that are typically printed on the surface with minimal or no protective layers to protect the aesthetic print layer.

Various printing inks can be used including solvent, UV cured, silkscreen ink and other forms of ink as long as there is appropriate adhesion and the ability to have some stretch for thermofoiling applications. In some test cases, certain inks are too rigid and may crack or loose adhesion in laminating processes. One suitable ink is a biobased ink (i.e, bioink) such as the type produced by Mubio for Mutoh Valuejet digital printing systems to provide a 100% biobased product including the ink layers.

In one embodiment, a thin PLA film less than about 0.010", less than about 0.005", may be reverse direct printed using wide format digital printers or other means of printing. A recycled mineral fiber composite including fiberized mineral and a biobased binder with a heavy surface texture may be prepared by cutting to size and a heat activated adhesive may be applied to the top and side surfaces. The image on the PLA film may be of a pattern, photo, signage or typically any form of computer generated artwork. The composite may be placed in a thermofoiling machine along with the printed film over the surface. The PLA film may be only heated to about 140° F. and held for a few seconds. At typical thermofoiling temperatures, this film may sag and create holes during vacuum processing. A vacuum may then be applied under the warm film and it may then completely conforms to the rough stone-like texture of the mineral fiber composite. The resultant "ecoart" may be highly wear resistant due to the fact that the print layer is below the clear film layer. The end product also results in an approximate 30% biocontent and a 60% recycled content with the balance of 10% a natural clay.

The biolaminate layer may include one or more layers of the extruded biolaminate material. In producing a multilayer, a heat laminating process may be used to form the layers together into the biolaminate surface layer. Each layer may be the same, may be similar, or may have specific and different functions. Multiple layers of biolaminate may be fused together by heat and pressure in which the material is slightly below the melting point of the biopolymer using hot press systems and reasonable pressures around 50 PSI. Other means of fusing two layers of biolaminate may be used including adhesive double side tapes, heat activated adhesives, solvent bonding, and other methods. Fused together they form a multilayer functional biolaminate that then can be laminated or thermoformedonto a non plastic substrate to form a biolaminate composite assembly.

The biolaminate composite or any layer thereof may be laminated onto a non plastic substrate. Optionally, a paper, non woven mat, woven mat or other forms of backer may be positioned on the back of the biolaminate surface prior to laminating onto a nonplastic rigid substrate. Various fabricators may use simple water based PVA glues in the field for good adhesion of the biolaminate to the non plastic rigid substrates. In addition, this may provide additional functional performance of the biolaminate layer.

In some embodiments, heat activated adhesives may be used for contacting the biolaminate. This may be useful for simple cold press adhesives, such as PVA, that require that the laminate underside absorb water and create a bond without heat. The biolaminate of these embodiments may be completely waterproof on both sides, for example. Thus by the usage of heat processing in laminating the "polar" nature of the PLA is increased and creates a high degree of bond strength required for specific applications. Another suitable method of laminating may be in a hot pressure laminating process using a heat activated or heat cured adhesion.

Laminating may include flat laminating or three dimensional laminating processes. Flat lamination is used currently with high pressure laminates to adhere the laminate onto a wood or agrifiber composite substrate. Flat laminating is based on the application of an adhesive or glue layer onto either the substrate or laminate then using pressure to laminate together. Flat laminating may use many types of glues and processes including both hot press, cold press or pressure sensitive systems. Hot laminating system may allow for improved adhesion between the biolaminate and the substrate.

Thermofoil laminating or thermoforming is commonly used for three dimensional laminating in which a non plastic substrate is machined into a three dimensional part such as a table top, worksurface, cabinet door or the like. A water based urethane adhesive may be sprayed onto the substrate. By means of heat and pressure using a vacuum or membrane press, the biolaminate layer may be formed to the substrate and simultaneously the adhesive may be heat activated to cure, Profile wrapping is similar to that of thermoforming (i.e., thermofoiling) but is done using linear processing equipment to create millwork, windows, and other linear components. In this embodiment, the substrate may either be machined from a wood or agrifiber composite into a linear millwork shape. This may also be accomplished by extruding a shape from a natural fiber or mineral with a plastic as to eliminate the machining and reducing the waste from machining. Using a profile wrapping machine, typically, a hot melt contact adhesive may be applied hot to the substrate or biolaminate then pressed using a series of small rollers to form the biolaminate layer onto the linear substrate.

In standard laminate worksurfaces, an edgebanding is required. A biopolymer, such as PLA processed below its melting point and in its viscoelastic state similar to producing the biolaminate, may be used to produce profiles such as shaped edgebanding and other support components. Either a tee molding that is mechanically attached to the non-plastic rigid substrate or a flat profile edgebanding that is glued is described within these embodiments. Matching bioedgebanding may be produced using the same biopolymer or biocopolymer system and process to allow for matching aesthetics and performance. In addition, a matching linear profile wrapped millwork product may be produced using the biolaminate surface layer laminated onto a wood, agrifiber or plastic fiber composite extrusion to create an aesthetic matching green system for an entire office or building solution.

Other means of creating a matching edgebanding or matching millworkprofile may be accomplished using pro file extrusion methods of a composite substrate in a continuous linear shape such as millwork. The biolaminate layer may be laminated using a linear wrapping process and a hot melt adhesive to create a myriad of environmental millwork as a replacement for PVC foamed or PVC wrapped millwork.

High pressure laminates typically come with supporting products such as edgebanding in the form of slit laminate or profile extruded linear shapes. In the embodiments of the invention, the biolaminate layer may be slit or cut into strips to be used as matching edgebanding. The "slit" or cut biolaminate layer may then laminated to the edge of the substrate by means typically of a hot melt adhesive with slight pressure. The biolaminate layer edgebanding may then trimmed. The biolaminate surface layer edgebanding may also be printed or extruded with solid colors and patterns.

The embodiments of the present invention use a novel method and optional compositions to maintain crystallinity of a PLA or other biopolymer through processing and maintain this in the end profile extrusion or sheet components. Embodiments utilize higher shear, which is not recommended by the manufacture of PLA products, and very low processing temperatures typically below that of 320° F. or 300° F. to process the material in its elastomeric state well below its melting point and recommended processing point of 380° F. to 420° F. where the material converts to a fully amorphous material. Conventional processes provide a cloudy extruded component versus a clear and more brittle packaging material.

At this processing temperature, the material may be fully crystallized, but below the temperature and processing parameters to create a full amorphous material. The resultant materials may be cloudy, but have a significantly higher flexibility while still maintaining a high degree of mechanical performance.

By maintaining a crystalline state or partial crystalline state by the process within embodiments of this invention, stickiness of the polymer may be greatly reduced and advantageous properties may be retained for products that may replace PVC in profile and extrusion applications. Also, within the processing parameters of the embodiments of the present invention, the material may have a different rheology and melt index that may allow processing into extruded three dimensional shapes.

Additives may also assist in these embodiments and still maintain the crystalline state of the PLA or PLA admixtures. Nanomaterials, fillers, fibers, proteins, starch, wood flour, wood fibers papermill waste and other materials may increase the nucleation of the PLA and affect the crystalline states to the material. By processing well below the melting point and through the usage of high shear it may be possible to maintain a less brittle state of the PLA and be able to more closely match the desired properties of PVC products and applications requirements. Other nucleating agents, fillers, fibers and materials have been tested with positive results using this novel process methodology.

Method for Making a Cellulosic Biolaminate Composite Assembly

Embodiments relate to a product and method for making a biolaminate assembly utilizing a non saturated paper and layers of extruded biopolymer dry films that once a stack of the nonsaturated papers and biopolymer films are subjected to heat, pressure, and moisture, the biopolymer film changes viscosity as to allow saturation and impregnation of the paper and fuses multiple layers together into a monolithic composite structure. This structure may be used for either decorative surfacing, such as by use as a decorative surfacing laminate layer, or structural composite applications. Embodiments relate to a product and methods for making a biolaminate assembly utilizing a saturated or resin impregnated paper layer, in particular a decorative surfacing laminate layer. Embodiments of the present invention include biolaminate assemblies utilizing a saturated paper with substantially no formaldehyde emission. Such embodiments may be used as replacements for high pressure laminates. Another embodiment utilizes standard methods to work with existing form formaldehyde based laminate production processes. A further embodiment may be to improve post forming characteristics without the need of applying pressure during resin production, or expensive modifiers.

Generally, the method may comprise providing a first paper layer, providing a biobased polymer film layer, and providing a second paper layer. The first paper layer and the second paper layer may be at least partially saturated with a biobased polymer, such as from the biobased polymer of the biobased polymer film layer and/or from an additional biobased polymer source. The first paper layer, the biobased polymer film layer, and the second paper layer may be fused under means of heat and pressure to form the biolaminate structure. Fusing may be done at a pressure between about 20 psi and about 1500 psi, for example. In some embodiments, the biolaminate layer, such as a PLA biopolymer, can be in a dry extruded film form.

Various of these steps will now be described in more detail.

Any suitable woven or nonwoven cellulosic paper may be used. Suitable papers include, for example, plain paper, kraft paper, treated paper, wood based paper, recycled papers, decorative paper, printed paper, fiber reinforced papers, glass fiber reinforced paper, thin wood veneers, fire retardant paper, chemically treated paper, ph adjusted papers, or a combination thereof. The cellulosic paper may be a biobased paper from a renewable plant fiber such as hemp, baggase, wheat straw, and corn stover.

Various methods for impregnating the cellulosic layers with a biopolymer may be used. These include composite pressing a stack of at least one non-saturated paper and at least one biopolymer film, direct applying molten biopolymer to non-saturated paper, and saturating the cellulosic papers with a liquid biopolymer.

In composite pressing of a stack of at least one non-saturated paper and at least one biopolymer film, the stack is processed under heat and pressure conditions within a hot press. Temperatures can range from 310 F to 400 F, but not limited to, and pressure ranging from 20 psi to 1500 psi. Residual moisture content of the paper and paper chemistry will have an effect on the time required to fully saturate and impregnate the papers within the press system and effects the dynamic rheology of the biopolymer. This method removes the current process wherein papers are required to be saturated prior to the composite pressing process.

In embodiments using direct application of molten biopolymer, for example molten PLA, the molten PLA may be direct applied using roll coating. Various additives can be blended into either the paper or into the molten PLA prior to coating applications to enhance properties or processing speeds. Various papers layers are placed through a hot melt roll coating machine in which PLA in molten liquid form is directly applied to the paper and ran through chilled rollers. The coated paper layers are then stacked into the desired amount of layers and placed under heat and pressure in a composite press. Temperatures range from 310 F to 400 F and pressures between 20 psi to 1500 psi as to saturate, impregnate and fuse layers together as to create a monolithic structural composite structure.

In embodiments using liquid biopolymer, woven or nonwoven cellulosic paper or various forms of biobased fiber papers may be saturated with a liquid form of PLA or LA. The paper may then be submersed in a bath of liquid LA with a low viscosity sufficient to absorb into the paper. Lactic acid is the precursor to polylactic acid and may be in a low viscosity for in that absorbs into the paper.

The LA saturated paper may then be dried using heat, air or other drying methods commonly used in drying saturated papers. In some embodiments, the surface of the dried, saturated first paper layer may be texturized. Core layers of saturated paper may be plain papers. Surface layer or layers may be in the form of a preprinted pattern, color or image printed by standard means of printing including but not limited to wide format UV digital printing.

Additives may be contacted with the paper or resin, one or more of drying agents, polymerizing agents, peroxides and other crosslinking agents, colorants, ETC and fire retardants.

Once the LA saturated paper is dried, one or more layers may be placed onto a textured paper, metal or composite platen. The platen may impart a texture onto the surface of the final laminate and also provides a uniform cooling process while the laminate is curing and cooling.

In one embodiment, a printed LA saturated paper may be placed on top. The single or stacked layers of LA saturated papers may be then thermally fused into a solid laminate sheet. Temperature range from about 120° F. to over about 300° F. until the LA is fully impregnated into the fibers, layers may be fused or the desired polymerization had occurred.

Thermofusing may be done using a hot platen press with pressure ranging from 20 psi to over 1000 psi depending on the final desired specific gravity or hardness of the biolaminate. In another embodiment, a hot roll press may be used to heat and fuse the layers into a solid laminate.

A single layer of paper may also be saturated and cured using the lactic acid polymer that may be used as a backer layer. In this case, the saturated paper may be produced, then may be thermally fused or adhered to a thin biobased film including a polylactic acid sheet with a color backcoat or digital imaged to produce a decorative laminate. The saturated LA paper provides for a paperback surface that may be easily laminated onto various rigid substrates including particleboard, MDF, agrifiber composites, mineral fiber composites and other types of thin or thick rigid composite structures, thus providing a waterproof and decorative surface option that is completely formaldehyde free.

Another embodiment includes laminating a clear polylactic surface layer and the LA saturated paper to impart a high degree of stain, chemical and wear resistance. In addition, this biobased wear layer may be refurbished with similar processes used in petrochemical polymer solid surface materials. Accordingly, in some embodiments, an overlay layer comprising a thermoset and thermoplastic standard overlay, a mineral plastic overlay, a bioplastic overlay, or a wear layer surface overlay may be provided.

Another method for curing the liquid LA resin saturated paper may be-through the-usage of Ebeam or UV cured technology in which photoinitiator is added to the LA resin prior to the paper saturating process. The saturated LA resin paper may then be placed under an Ebeam or UV light to final cure the material.

Uses

The biolaminate composite assembly can be made into table tops, desk tops, cabinet doors, cabinet boxes, shelving, millwork, wall panels, laminated flooring, countertops, worksurfaces, exhibit panels, office dividers, bathroom dividers, laminate flooring and other areas may use the system of the biolaminate in combination with a non-plastic substrate and adhesive layer to create a truly "green" solution for the growing demand for more environmentally friendly products.

A biolaminate composite assembly may be made into various forms of cabinet doors that are based on flat laminating, thermofoiled three dimensional, or integrating profile wrapping components and combining all of these together to create various designs of cabinet or passage way doors.

A biolaminate composite assembly may be formed as ecoart and may comprise a heavily textured mineral composite. Various heavily textured mineral composites may be commonly used for ceiling tile applications. Ceiling tiles of various heavy surface textures and composition may be used. Ceiling tiles may typically be fire retardant and thus the above imaged tile or panel meets such specifications.

The biolaminate surface layer can also be plasticized to a high degree using various normal or preferably biobased plasticizers to create a more flexible biolaminate surface layer that can be produced as a wall covering that is adhered onto wall board as a high performance wall covering that may replace PVC vinyl wall coverings. In this embodiment, a secondary non woven cloth may be laminated onto the backside of the biolaminate layer to provide improved performance while maintaining flexibility. The biolaminate layer that is highly plasticized as above, may also be used as a replacement for flexible PVC media for printing.

A biolaminate composite assembly utilizing a PLA biocopolymer biolaminate based on a plasticizer or processing aid additive and the addition of a "nanoquartz" additive to the biolaminate surface layer provides for a high degree of wear and temperature resistance sufficient to be used in countertop applications. Currently food grade surfaces consist primarily of HDPE and stainless steel. Stainless is expensive and HDPE may trap food or liquids in scratches or cuts within the surface. The "nanoquartz" technology may provide good performance and durability of the surface. A biolaminate laminate assembly integrating quartz may also provide a lower cost option for expensive granite and other solid surfacing composites for kitchen countertops, tables, and other higher performance areas. These forms of biolaminate layers may be either flat laminated or thermoformed into three dimensional worksurface for kitchen and other forms of countertop applications.

Currently, PLA is very difficult to extrude into profile shapes due to its poor melt stability, high melt index, and other factors. Embodiments of this invention describe a method to extrude PLA or other biopolymer into shapes and compositions that assure that the material will not degrade in various longer term commercial profile extruded applications and products. Secondly, embodiments of the inventions describe methods of processing that provide high quality profiles and material compositions that may directly compete with or replace current hazardous plastics such as PVC in architectural, commercial and industrial markets. The profile extruded PLA or PLA biocomposite can be used as a substrate for the biolaminate surface layer or be colored to match the biolaminate. This biolaminate composite system of merging an environmentally friendly substrate with a biolaminate derived from rapidly renewable resources provides a true environmental solution for future worksurfaces and other applications where HPL or PVC thermofoil components are commonly used.

EXAMPLES

Example 1

PLA pellets were placed into an extruder with temperatures settings 20° F. above the melting point at 420° F. which is also recommended by Natureworks for processing temperature. The material poured out of the die like honey sticking to the die. The temperature was dropped to 310° F., over 80° F. lower than its melting point. The RPM was increased to add shear input to the material. The resultant shape held its complex shape with minimal distortion.

Example 2

PLA pellets were placed into an extruder using a sheet die with processing temperatures of 380 to 420° F. and a clear sheet was produced. The sheet was brittle and easily cracked when bent. The resultant sheet was flat laminated onto a wood particleboard using a heat activated glue under heat and pressure using a hot press with temperature of 150° F. and pressures under 50 PSI. The material showed very good adhesion to the substrate.

The same sheet as above was laminated using a cold laminating method commonly used for HPL using a PVA and cold press laminating method. The PLA biolaminate sheet did not have any adhesion to the substrate and was easily pulled away.

PLA pellets were placed into a open twinscrew extruded and processing, temperatures were lowered to 320° F. and material pulled out of the extruder through the vent before the die section.

PLA was placed into an extruder and processed at temperatures below 330° F. well below the melting point using a sheet die. The resultant film was cloudy but had very good melt strength. After cooling it was very apparent that the material was more flexible and had better properties. The thickness of the biolaminate was 0.015"

The resultant sheet from above was hot laminated onto an agrifiber substrate comprising of wheatstraw using a heat activated glue and pressure. The resultant bond strength was very good and in adhesion tests fiber was being pulled away from the particleboard sticking to the biolaminate showing that the adhesive bond was better than the internal bond of the wheat particleboard.

The resultant sheet of biolamiante was then placed into a membrane press with a machined three dimensional substrate wherein the substrate had a heat activated uretane preapplied. A temperature of 160° F. with less than 50 PSI was applied for over two minutes. A comparison test using a PVC film of 0.012" with a chemical solvent primer to improve adhesion was also membrane pressed using the same substrate, glue and method. The forming of the biolaminate showed equal stretching and forming ability as compared to the PVC. Both the PVC and biolaminate samples were tested in regards to adhesion and were equal in bond strength even with the biolaminate not having a chemical primer to promote adhesion.

The biolaminate film was reversed printed using a solvent inkjet system. The initial ink bond seemed to be sufficient by means of cross hatching the surface and performing a tape peal test. The reversed printed biolaminate was then thermofoiled using heat and pressure in combination with the heat activated urethane adhesive wherein the ink layer was in contact with the laminating adhesive layer and substrate. After processing, a peal test was done. The ink separated from the biolaminate film not having sufficient bond strength. A second test was done wherein the surface of the biolaminate was treated with a solvent chemical before printing. Although improvements were seen in adhesion, it was not sufficient for this application.

A clear biolaminate was direct top printed and coated with a clear liquid topcoat of urethane. The topprinted biolaminate was hot laminated onto a substrate. The bond between the clear biolaminate and substrate was sufficient were fiber tear out was seen on the substrate.

A UV cured screen printing ink was applied to the backside of the clear biolaminate or reversed printed. The biolaminate was thermofoiled using heat and pressure with a urethane heat activated adhesive with the printed side in contact with the adhesive and substrate layer. The adhesion was significantly improved over the standard solvent ink printing process with fiber tear-out of the substrate.

Two three dimensional cabinet door was machined out of medium density fiberboard in the shape of a classic raised panel cabinet door. The first door was processed in a membrane press and standard heat activated thermofoil process using a PVC thermofoil of 0.010". Press time was 2.5 minutes with 50 PSI at a temperature of 170° F. The second door was processed to the same methods only using a biolaminate surface layer to replace the PVC film. The resultant forming process was surprisingly the same with the same stretching and forming nature of the PVC. Although the PVC had a primer to promote adhesion on the backside and our biolaminate did not, we seen very similar adhesion to the substrates as measured by peal testing. The pull down on the edge of the cabinet door due to the forming process also was the same between the PVC and biolaminate.

A PVC film and biolaminate surface layer were thermoformed onto a three dimensional cabinet door shaped substrate using the same urethane adhesive. Both the PVC and biolaminate were subjected to independent testing according to high pressure laminate standards (NEMA LD3). The resultant data shows that the biolaminate had improved stain resistance, improved tabor wear resistance, and improved mar resistance than the standard PVC decorative surfacing product.

A piece of WilsonArt standard grade high pressure laminate was laminated to a wood particleboard substrate using a contact adhesive. The biolaminate sheet was also laminated to the same wood particleboard using the same contact adhesive and subjected to independent testing in accordance with NEMA LD3 requirements. In this test the biolaminate had over 5 times the impact strength, improved stain resistance, over 2 times the scratch resistance, and other performance improvements.

Different results after secondary heat test was done to evaluate the change in state of the PLA as it was subjected to multiple heat histories. The PLA film produced at a temperature below its melting point in its viscoelastic state at 340° F. was produced in a 0.010" thickness film. The film was reversed printing using a UV cured ink system and a direct printing inkjet system. The samples were broken into two groups and group I samples were tested for impact, hardness, and scratch resistance. The second group of samples were hot laminated using a membrane press and a thermally activated urethane for 2.5 minutes at a temperature of 170° F. until the glue was cured. These second group of samples were tested directly against the first group. The second group showed a harder surface with improved scratch resistance, but lower impact resistance.

A wood bioplastic profile extrusion was produced at a temperature between 310 to 320° F. with about 20% loading of wood fiber creating a linear shaped piece of millwork. The biolaminate surface layer was heated with a heat activated adhesive applied to the backside of the biolaminate surface layer and compared to PVC films processing using the same method. The biolaminate surface layer had very similar adhesion and formed surprisingly similar to that of the PVC film.

A 3M contact adhesive used for laminate was sprayed on the back side of the biolaminate surface layer and onto a flat wheat board agrifiber substrate. After a minute to flash off any volatiles, the materials were laminated together using pressure from a roller system. A second sample of PVC decorative film was also used on a second sample. The biolaminate had an improved adhesion.

Example 3

A soybean wax was added to the PLA at 5% and extruded through a profile die. The temperature was dropped to 290° F. and the material was a smooth high integrity shaped with good melt strength sufficient to hold a profile shape. Shear was increased and the shape was improved and smoothness of surface was also improved. The hot shaped article was pulled onto a conveyor belt with no changes in shape from the die.

Example 4

PLA and a hydrogenated soybean wax supplied from ADM was compounded into a biocopolymer of a flexible nature with ratios of PLA to Soy of 95:5. The resultant compound was then re-compounded with various powdered non halogenated fire retardants at various levels. Mag Hydrox, Alumina Tryhydrate, and ammonium phosphate were all added from levels of 10% to 50%. A strong reaction took place with the MH and ATH materials that created difficulty in mixing and would form layers within the material. The Amon phos material blended well and formed a more homogenous and more flexible material based on various loadings.

Example 5

PLA was compounded at a temperature below its melting point and within its viscoelastic state around 310° F. Glycerol was added at various levels from 1 to 20%. The resultant material was a homogenous flexible materials. A second test was done wherein PLA was heated over its melting point of 400° F. The same levels of glycerine were added. The glycerine was highly volatile and released significant smoke due to breakdown and created a non homogenous material and was difficult to compound into a homogenous material.

Wheat straw strands of an average length of ¾" and less than 0.020" in width were compounded with PLA and a soybean wax wherein the PLA to soybean wax was at a ratio of 95/5.5% and 10% addition of the wheat strands were compounded with the biocopolymer at a temperature within the viscoelastic state of the biocopolymer of 310° F. The material was homogenous, did not smell, and had good impact resistance. A second test was done using the same materials where the process was taken above the required melting point of the PLA of 400° F. The fibers did not interact with the biocopolymer well and significant browning and cellulosic degradation was seen. In addition the material showed signs of burning and clearly had a very negative smell.

PLA and EVA were compounded at a temperature of 310° F. A sample of biodac (papermill sludge particles) were colored by simply dying the particles and dried. The biodac was compounded at 20% with the biocopolymer at a temperature of 310° F. The resultant material had a unique aesthetics and was a tough high impact material. A second process was done using the same materials at a processing temperature above the melting point of the PLA. The resultant material showed signs of degradation and burning. The resultant material was highly brittle with minimal impact strength.

Example 6

PLA was placed in pan and put into an oven at a temperature over 400° F. Five samples pans were placed into the oven with PLA. An addition of 10% of plasticizers was placed in each pan. Plasticizers and lubricants were glycerine, wax, citric acid, vegetable oil, zinc stearate. After the PLA was molten the materials were mixed. During the heating virtually all of the plasticizers lubricants started smoking heavily with significant smell and starting to boil or degrade. The materials could not be mixed together. The same test was done only at a temperature of 300° F. over 80° F. below the melting point of the PLA. The plasticizers did not smoke, boil or degrade and were able to be mixed into a more homogenous material. Zinc stearate was the worst of these materials with the soybean wax being the easiest to blend.

Example 7

PLA and biofiber functional colorant system will be meter directly into the single screw sheet line wherein a high level of dispersion with low and medium shear input is required. Processing temperatures were set well below the melting point of the PLA which is over 380° F. In this test the heating sections where set at 310° F. to 315° F. at the die exit. The material was not sticky and had sufficient melt index to create a profile. The material was not clear as processing PLA at or above its melting point, but semitransparent maintaining its crystalline nature and had more flexibility and impact resistance. Cooling roll temperature we evaluated between 80° F. to over 200° F. We found that the material cooled significantly quicker due to the lower processing temperatures and required heating the rollers.

Example 8

PLA 2002 from Natureworks in pelleted form was compounded with 5% SWL-1, a congregated soybean wax products from ADM. Compounding was performed in a Brabender twin screw at a temperature of 300° F. over 80° F. below the melting point of the PLA. The material came out of a round die holding a good solid shape and was cooled. The material was a very opaque milk white color and the resultant material was able to be bent without breaking with a similar feel and performance t that of polyethylene.

A second compounding run was done increasing the amount of SWL-1 to 10% with 90% PLA. The material was lower in viscosity and processing temperature was decreased until the material held its round shape. Again the material was very opaque and white.

A third compound was done adding screened wheat fiber wherein a water based colorant was sprayed on the wheat fiber then dried. The colorized wheat fiber was compounded with 90% PLA, 5% SW1 and 5% colorized wheatfiber. To our surprise, the material was clear to semitransparent with a deep three dimensional look with randomized color fibers. The clearer PLA/SW was slightly tinted to the color of the wheat, but still maintained a transparent depth. The material was not as brittle as neat PLA and actually was similar in flexibility as our first run of 95% PLA and 5% SW1.

Example 9

PLA was compounded with 10% SW1 and 10% ground sunflower hulls in which the ground hulls were screened to remove the fines below 30 mesh. The resultant material was extruded into a sheet and a texture was imprinted on the hot material. After cooling the material showed a random flow decorative pattern. The material was placed in water and we observed the water beaded up on the surface of the material.

Example 10

PLA was compounded with a standard magnizume hydroxide fire retardant and extruded into a test bar. The test bar was very brittle and could be easily snapped by hand with minimal pressure. A second compound was done where 10% SW1 was added. The resultant material had good impact and could be bent.

Example 11

Wheat fiber was compounded with SW1 at a 50%/50% ratio at a temperature of 300° F. and mixed. The resultant material was cooled then granulated into small particles. The compound of wheat and SW1 was then dry blended with PLA pellets and compounded at 310° F. producing a flat test bar.

Example 12

Soy Wax SW1 was melted at a temperature of 300° F. in a 100 gm batch. An equal weight of wheat fiber was added and mixed. The soywax quickly impregnated the wheat fiber and left the fiber in a free flowing state. The impregnated fiber was lain out in the mat and pressed. Water was dripped on the top of the mat in which the water completely beaded up on the fibrous mat.

From this it was determined that roughly a 50/50 ration of soywax to fiber based on a specific bulk density and fiber geometry would fully impregnate the fibers. The admixture of 50/50 soywax/fiber was added at a 10% ration with PLA and compounded. The wax on the outside of the fibers where blended with the PLA and provided for a compatible interface. Only a small amount of wax was mixed into the clear PLA. The soywax at room temperature is an opaque white material. The resultant PLA and SW/impregnated fiber was still clear to semi transparent.

Example 13

A separate experiment took just the soywax at 5% and PLA at 95% and compounded the two together using a Brabender compounders. In this test the resultant material was opaque and milky white color. Thus we see that the addition of fiber allowed impregnation of the molten soywax prior to the PLA reaching a appropriate viscoelastic state to allow merging of the soywax/PLA system due to the transparency of the final biocomposite matrix.

Example 14

Sugar Beet pulp & Sunflower hulls—Ground sugar beet pulp and sunflower hulls were taken from a regional agricultural processing plant and gently ground or broken into fibers. The materials were screened with the resulting material in a range from 30 mesh to 4 mesh. The particles of sunflowers where a linear geometry wherein the sugar beet pulp were more of a uniform size, but random shape. A dye used in clothing was used to soak the fibrous particles then dried to fix the colorant. The two colored fibers where metered at a 10% rate with 10% soywax and 80% PLA into a brabender compounding system. As soon as the material hit the hot screw feed section the soywax melted and started to wet out the fibers even before entering the barrel section while the PLA was still in its hard state. Compounding temperatures where maintained well below the melting point of the PLA (PLA melting point at 390° F.) wherein the processing temperature was 90° F. below the melting point at 300° F. The resultant material was a uniform mixture that was not brittle and had a unique three dimensional nature. The exit of the compounder was shaped into a high tolerance rod. The exiting material held is shape with a high degree of tolerance.

Example 15

BioDac—A sample of BioDac was purchased from GranTek Corporation in Wisconsin which is a form of waste papermill sludge that has been compressed and dried forming small spherical balls with a mesh size of between 15-30 mesh. The BioDac was colored using a water based colorant and multiple colorized batches were produced. The colored biodac was compounded at a 20% level with 10% SW and 70% PLA. Compounding was done using a Brabender twin screw at a processing temperature of 310° F. The resultant material was then reheated and pressed into a composite sheet. The material very closely represented a solid surface looking material. Samples were submitted into a water bath for 24 hours and was water proof with no uptake of water measured.

Example 16

PLA was compounded with long fiber glass at levels of 2% to over 30% at a temperature below the melting point of the PLA (315° F.). A second test was done using the same ratios at a temperature above the melting point (400° F.). A second test was done wherein 5 and 10% addition of soybean wax was added.

Example 17

A biolaminate sheet comprising of PLA and soybean wax that was processed below the melting point of the PLA was taken and reheated at 200° F. A MDF substrate was formed into a shaped article and an adhesive was applied. The hot biolaminate was pushed and formed onto the substrate and allowed to cool. The resultant material showed a high level of adhesion and very good impact resistance.

Example 18

A piece of WilsonArt high pressure laminate was adhered onto a particleboard substrate using recommended adhesives. The biolaminate of a similar thickness was adhered to a matching particleboard using the same methods and adhesives. A hammer was dropped from 5 feet onto both samples wherein the edge of the hammer head impacted the samples. The HPL showed signs of cracking at the edge of the impact hit. The biolaminate showed no signs of impact at all.

Example 19 a piece of an agrifiber composite produced from wheatstraw were cut into 3 samples. The first sample was stained with a common wood stain to a dark cherry color. The wheat stain was very dark and "blotchy" covering and hiding most of the natural fiber appearance. A biolaminate surface was extruded in which one was a clear and the second run included a transparent dye colorant. The biolaminate sample containing a dye was then laminated using a clear adhesive onto the second non stained wheatboard sample. The clear biolaminate was printed using a transparent UV cured ink on the backside then also laminated to the third piece of wheatboard. In looking over the appearance of the three samples, the wood stain piece was no visually acceptable and did not show the desired wheatboard texture. The agrifiber clearly stained very different than a natural wood. The second sample with the dye extruded into the biolaminate surface clearly was the same overall dark cherry color, but the pattern of the wheatboard was very clearly defined. The look was also very deep due to the optics of the dye containing biolaminate layer. The UV transparent printing was near the appearance to the dyed biolaminate with similar color and optics still showing the individual fiber nature of the wheatboard and providing a good stained color. Another similar test was done using real wood. Both the integrated dye and the transparent printed biolaminates maintained a better aesthetics of the wood grain than the liquid staining process and provided a single processing step to finish the wood as compared to the two step process of staining and finishing typically done using wood.

Example 20

A plain kraft paper, then an biopolmer PLA extruded film (0.005") is placed on top of the kraft. A second kraft is place on the top so that the PLA film is "sandwitched" between the unsaturated kraft paper. This alternating stack can be repeated to create thicker structures. The two layers of haft with the biopolymer film between is then placed into a heated press at 350 degrees F. and pressure over 20 PSI and more preferable between 150 to 500 psi. Two stacked layers were prepared.

The first stack of alternating layers were placed in a press for 1 minute and removed. In breaking the final composite, the paper was not fully saturated or impregnated in which dry sections of paper were found. In addition the composite could be torn apart due to the low internal bond of the unsaturated papers.

The second stack of alternating layers were placed in the same press and same temperature extending the press time to 8 minutes. Once the composite was cooled, the layers were fully saturated and could not be torn. In cutting various layers with a knife, the kraft paper had darken due to the saturation of the PLA through the kraft also showing on the opposite side.

Both pieces were cut and sanded on their edges and inspected using a microscope. The first sample with the 1 minute cycle showed where the PLA was partically impregnating and saturating through the kraft, but not completely through whereas the second sample with the longer press time was completely saturating the paper layers.

Both pieces were also subjected to water emersion. The first sample pressed for 1 minute had very high absorption and swelling due to the non saturated kraft paper. The second sample look virtually water proof without swelling or surface roughness.

Example 21

A second film using standard acrylic (0.005) was done replacing the PLA in which the Acyrlic film was between two layer of kraft paper. The stack was placed in a press under the same conditions above and for the full 8 minutes. The sample was removed and cooled. The material has no saturation and barely stuck the two layers together. The samples were easily pulled apart and had no strength nor stiffness.

To further illustrate, the following embodiments are here described:

1. A biolaminate composite assembly, comprising:

one or more biolaminate layers;

a non-plastic rigid substrate; and an adhesive layer, in contact with the substrate and the one or more biolaminate layers;

wherein the one or more biolaminate layers is laminated to the substrate.

2. The biolaminate composite assembly of embodiment 1, wherein laminated comprises flat laminated.

3. The biolaminate composite assembly of embodiment 1, wherein a single biolaminate layer contacts a single side of the non-plastic rigid substrate.

4. The biolaminate composite assembly of embodiment 1, wherein two or more biolaminate layers contact two or more sides of the non-plastic rigid substrate.

5. The biolaminate composite structure of embodiment 2, wherein flat laminated comprises hot pressed, cold pressed, nip rolled, sheet form, full panel form, custom cut, or some combination thereof.

6. The biolaminate composite assembly of embodiment 1, wherein the adhesive comprises a glue line.

7. The biolaminate composite assembly of embodiment 1, wherein the adhesive layer comprises a heat activated adhesive.

8. The biolaminate composite assembly of embodiment 1, wherein the adhesive layer comprises a contact adhesive.

9. The biolaminate composite assembly of embodiment 1, wherein the adhesive layer comprises a cold press adhesive.

10. The biolaminate composite assembly of embodiment 9, wherein the adhesive layer comprises a pressure sensitive tape.

11. The biolaminate composite assembly of embodiment 1, wherein the substrate comprises a composite matrix.

12. The biolaminate composite assembly of embodiment 1, wherein the substrate comprises wood composite, MDF, HDF, plywood, OSB, wood particleboard, wood plastic composite, agrifiber plastic composite, agrifiber particleboard, agrifiber composite, gypsum board, sheet rock, hardboard, metal, glass, cement, cement board, cellulosic substrates, cellulose paper composites, multilayer cellulose glue composites, wood veneers, bamboo, recycled paper substrates or a combination thereof.

13. The biolaminate composite assembly of embodiment 1, wherein the substrate comprises substrates that are derived from agrifibers using a formaldehyde free matrix resin.

14. The biolaminate composite assembly of embodiment 1, wherein biolaminate composite assembly comprises work surfaces, shelving, millwork, laminated flooring, countertops, tabletops, furniture components, store fixtures, dividers, wall coverings, cabinet coverings, cabinet doors, passageway doors or combinations thereof.

15. The biolaminate composite, assembly of embodiment 1, wherein the one or more biolaminate layers comprises a thickness of about 0.005 to about 0.25".

16. A biolaminate composite assembly of embodiment 15, wherein two or more of the one or more biolaminate surface layers are thermally fused together by heat fusion or an adhesive.

17. The biolaminate composite assembly of embodiment 1, wherein the biolaminate composite assembly comprises a thickness of about 0.050" to about 1.5".

18. The biolaminate composite assembly of embodiment 1, wherein one or more biolaminate layers comprise PLA, PHA or a combination thereof.

19. The biolaminate composite assembly of embodiment 1, wherein one or more biolaminate layers comprise bioplastics, biopolymers, modified biopolymer, biocomposite or a combination thereof.

20. A biolaminate composite assembly of embodiment 19, wherein bioplastic, biopolymer, modified biopolymer, and a biocomposite comprises polylactic acid base material.

21. The biolaminate composite assembly of embodiment 1, wherein one or more biolaminate layers comprise a modified PLA in combination with one or more of a plastic, bioplastic, additive or bioadditives.

22. The biolaminate composite assembly of embodiment 1, wherein one or more biolaminate layers comprise a modified PLA in combination with one or more of a filler, fiber or colorant.

23. The biolaminate composite assembly of embodiment 1, further comprising one or more print layers.

24. The biolaminate composite assembly of embodiment 23, wherein the print layers are positioned on a top surface of the one or more biolaminate layers, a bottom surface of the one or more biolaminate layers or in between the one or more biolaminate layers.

25. The biolaminate composite assembly of embodiment 1, wherein the one or more biolaminate layers further comprise bioplasticizers, biolubricants or both.

26. The biolaminate composite assembly of embodiment 25, wherein bioplasticizers comprise citric esters, esters, lactic acid, and other forms of biobased plasticizer.

27. The biolaminate composite assembly of embodiment 25, wherein biolubricants comprise natural waxes, lignants or a combination thereof.

28. The biolaminate composite assembly of embodiment 1, wherein the one or biolaminate layers comprise a flexibility comparable to that of a flexible PVC layer.

29. The biolaminate composite assembly of embodiment 1, further comprising one or more decorative additives.

30. The biolaminate composite assembly of embodiment 29, wherein the one or more decorative additives include a colorant, texture, decorative particles, decorative flakes or natural impregnated fibers.

31. The biolaminate composite assembly of embodiment 30 wherein the colorant allows for a natural depth of field providing a three dimensional aesthetic value.

32. The biolaminate composite assembly of embodiment 1, further comprising functional additives.

33. The biolaminate composite assembly of embodiment 32, wherein the functional additives include EVA, FR, natural quartz, bioplasticizers, biolubricants, minerals, natural fibers, synthetic fibers, impact modifiers, antimicrobial, conductive fillers, or a combination thereof.

34. The biolaminate composite assembly of embodiment 1, wherein the one or more biolaminate layers comprise a rolled or pressed textured surface.

35. The biolaminate composite assembly of embodiment 1, furthering comprising a non-plastic rigid substrate in contact with a second side of the one or more biolaminate layers.

36. The biolaminate composite assembly of embodiment 1, further comprising a bioplastic edgebanding.

37. The biolaminate composite assembly of embodiment 1, wherein the one or more biolaminate layers comprise edgebanding.

38. The biolaminate composite assembly of embodiment 1, wherein the non-plastic rigid substrate comprises biobased edgebanding and biolaminate surfaces.

39. The biolaminate composite assembly of embodiment 38, wherein both the one or more biolaminate layers and edgebanding comprise PLA, modified PLA or both.

40. The biolaminate composite assembly of embodiment 1, wherein the lamination is done using a hot press process, roll lamination, cold press process, or utilizing contact adhesives.

41. The biolaminate composite assembly of embodiment 1, further comprising a fire retardant.

42. The biolaminate composite assembly of embodiment 1, wherein the one or more biolaminate layers further comprise natural minerals.

43. The biolaminate composite assembly of embodiment 1, wherein the biolaminate composite structure comprises a three dimensional appearance.

44. A biolaminate composite assembly, comprising:
- one or more biolaminate layers;
- a three-dimensional non-plastic rigid substrate; and
- an adhesive layer, in contact with the substrate and the one or more biolaminate layers;
- wherein the one or more biolaminate layers is thermoformed to two or more surfaces of the substrate.

45. The biolaminate composite assembly of embodiment 44, wherein thermoforming is permanent.

46. The biolaminate composite assembly of embodiment 44, wherein thermoformed comprises vacuum forming, linear forming or a combination thereof.

47. The biolaminate composite assembly of embodiment 44, wherein the adhesive layer comprises a glue fine.

48. The biolaminate composite assembly of embodiment 44, wherein the substrate comprises a composite matrix.

49. The biolaminate composite assembly of embodiment 44, wherein the substrate comprises wood composite, MDF, HDF, plywood, OSB, wood particleboard, wood plastic composite, agrifiber plastic composite, agrifiber particleboard, agrifiber composite, gypsum board, sheet rock, hardboard, metal, glass, cement, cement board, cellulosic substrates, cellulose paper composites, multilayer cellulose glue composites, wood veneers, bamboo, recycled paper substrates or a combination thereof.

50. The biolaminate composite assembly of embodiment 44, wherein the substrate comprises substrates that are derived from agrifibers using a formaldehyde free matrix resin.

51. The biolaminate composite assembly of embodiment 44, wherein biolaminate composite assembly comprises work surfaces, shelving, millwork, flooring, countertops, tables, dividers, wall coverings, cabinet coverings, cabinet doors, store fixture components, passageway doors or combinations thereof.

52. The biolaminate composite assembly of embodiment 44, wherein the one or more biolaminate layers comprises a thickness of about 0.005 to about 0.25".

53. The biolaminate composite assembly of embodiment 44, wherein the biolaminate composite assembly comprises a thickness of about 0.030" to about 1.5".

54. The biolaminate composite assembly of embodiment 44, wherein one or more biolaminate layers comprises PLA, PHA and other bioplastics/biopolymers.

55. The biolaminate composite assembly of embodiment 44, further comprising bioplasticizers and biolubricants.

56. The biolaminate composite assembly of embodiment 44, further comprising one or more decorative additives.

57. The biolaminate composite assembly of embodiment 56, wherein the one or more decorative additives include a colorant, texture, decorative particles, decorative flakes or natural impregnated fibers.

58. The biolaminate composite assembly of embodiment 57 wherein the colorant allows for a natural depth of field providing a three dimensional aesthetic value.

59. The biolaminate composite assembly of embodiment 44, further comprising functional additives.

60. The biolaminate composite assembly of embodiment 59, wherein the functional additives include EVA, FR, natural quartz, bioplasticizers, biolubricants, minerals, fibers, synthetic fibers or a combination thereof.

61. The biolaminate composite assembly of embodiment 44, wherein the biolaminate composite structure comprises a rolled or pressed textured surface.

62. The biolaminate composite assembly of embodiment 44, furthering comprising a non-plastic rigid substrate in contact with a second side of the one or more biolaminate layers.

63. The biolaminate composite assembly of embodiment 44, further comprising a fire retardant.

64. The biolaminate composite assembly of embodiment 44, further comprising natural minerals.

65. The biolaminate composite assembly of embodiment 64, wherein natural minerals comprise minerals meeting high wear resistant HPL standards.

66. The biolaminate composite assembly of embodiment 44, wherein the biolaminate composite structure comprises a three dimensional appearance.

67. A method for making a biolaminate composite assembly, comprising:
- laminating one or more biolaminate layers to a non-plastic rigid substrate.

68. The method of embodiment 67, further comprising reverse printing on the one or more biolaminate layers.

69. The method of embodiment 67, wherein the one or more biolaminate layers is clear or transparent.

70. The method of embodiment 67, further comprising direct printing to the one or more biolaminate layers.

71. The method of embodiment 67, further comprising multilayer printing to the one or more biolaminate layers:

72. The method of embodiment 67, further comprising printing a decorative print layer between two or more of the biolaminate layers.

73. The method of embodiment 72, further comprising thermally fusing two or more biolaminate layers together.

74. The method of embodiment 67, further comprising printing a decorative layer to the one or more biolaminate layers.

75. The method of embodiment 74, wherein printing comprises offset printing, inkjet printing, screen printing or flexographic printing.

76. The method of embodiment 74, wherein printing utilizes a bioink.

77. The method of embodiment 67, further comprising applying a clear liquid coating to the one or more biolaminate layers.

78. The method of embodiment 77, wherein applying comprises spraying, rolling, offset printing, or rod coating method.

79. The method of embodiment 67, wherein the one or more biolaminate layers comprises a clear top layer, a decorative interior layer and an opaque layer, each layer thermally fused to the adjacent layer.

80. The method of embodiment 70, further comprising applying a clear coating on an outer surface of the printed one or more biolaminate layers.

81. A method for making a biolaminate composite assembly, comprising:

thermoforming one or more biolaminate layers to a non-plastic rigid substrate.

82. The method of embodiment 81, wherein forming comprises thermoforming, vacuum forming, thermoforming or a combination thereof.

83. The method of embodiment 81, further comprising reverse printing on the one or more biolaminate layers.

84. The method of embodiment 81, wherein the one or more biolaminate layers is clear or transparent.

85. The method of embodiment 81, further comprising direct printing to the one or more biolaminate layers.

86. The method of embodiment 81, further comprising multilayer printing to the one or more biolaminate layers.

87. The method of embodiment 81, further comprising printing a decorative print layer between two or more of the biolaminate layers.

88. The method of embodiment 87, further comprising thermally fusing two or more biolaminate layers together.

89. The method of embodiment 88, further comprising printing a decorative layer to the one or more biolaminate layers.

90. The method of embodiment 89, wherein printing comprises offset printing, inkjet printing, screen printing or flexographic printing.

91. The method of embodiment 89, wherein printing utilizes a bioink.

92. The method of embodiment 81, further comprising applying a clear liquid coating to the one or more biolaminate layers.

93. The method of embodiment 92, wherein applying comprises spraying, rolling, offset printing, or rod coating method 94. The method of embodiment 81, wherein the one or more biolaminate layers comprises a clear top layer, a decorative interior layer and an opaque inner layer, each layer thermally fused to the adjacent layer.

95. The method of embodiment 85, further comprising applying a clear coating on an outer surface of the printed one or more biolaminate layers.

96. A decorative biolaminate layer, comprising:

a clear biopolymer layer;

an opaque biopolymer layer; and a decorative print layer;

wherein the print layer is positioned between the clear layer and opaque layer.

97. The decorative biolaminate layer of embodiment 96, wherein the clear biopolymer layer is textured.

98. The decorative biolaminate layer of embodiment 96, wherein positioned comprises fused.

What is claimed is:

1. A biolaminate structure, comprising:

a first cellulosic layer;

a second cellulosic layer; and polylactic acid substantially completely saturating the first cellulosic layer and the second cellulosic layer;

wherein the first cellulosic layer and the second cellulosic layer are fused together to form a rigid film composition to be adhered to a substrate for making walls, flooring, or work surfaces; and a film layer comprising polylactic acid, the film layer being printed with an image and provided over the rigid film composition.

2. The structure of claim 1, wherein the biolaminate structure is suitable for use as a decorative surfacing laminate layer.

3. The structure of claim 1, wherein the biolaminate structure exhibits substantially no formaldehyde emission and is suitable for a replacement for high pressure laminates.

4. The structure of claim 1, wherein at least one of the first cellulosic layer and the second cellulosic layer comprises plain paper, kraft paper, treated paper, wood based paper, recycled papers, decorative paper, printed paper, fiber reinforced papers, glass fiber reinforced paper, thin wood veneers, fire retardant paper, chemically treated paper, ph adjusted papers, or a combination thereof.

5. The structure of claim 1, further comprising an overlay layer comprising a thermoset standard overlay, a thermoplastic standard overlay, a mineral plastic overlay, a bioplastic overlay, or a wear layer surface overlay.

6. The structure of claim 1, wherein an additive is contacted with one or more of the layers or the polylactic acid.

7. The structure of claim 6, wherein the additive is selected from the group consisting of drying agents, polymerizing agents, peroxides, crosslinking agents, colorants, fire retardants, impact modifiers, processing aids, lubricants, and pH modifiers.

8. The structure of claim 1, wherein at least one of the first cellulosic layer and the second cellulosic layer comprises a biobased paper from a renewable plant fiber selected from the group consisting of hemp, baggase, wheat straw, and corn stover.

9. The structure of claim 1, further comprising one or more additional cellulosic layers impregnated with a bio-based polymer to form a thicker biolaminate structure.

10. A biolaminate structure, comprising:

a first layer comprising a paper substrate substantially completely saturated with polylactic acid; and a second layer substantially completely saturated with polylactic acid, the second layer in contact with the first layer;

wherein the biolaminate structure exhibits substantially no formaldehyde emission and meets NEMA LD3 testing requirements; and wherein the first layer and the second layer are adhered together to from a rigid film composition; and a film layer comprising polylactic acid, the film layer being printed with an image and provided over the rigid film composition.

11. The biolaminate structure of claim 10, wherein the second layer is a paper substrate.

12. The biolaminate structure of claim 10, wherein the second layer is a biobased film comprising a polylactic acid sheet.

13. The biolaminate structure of claim 10, wherein the second layer is a clear polylactic acid surface layer.

* * * * *